(12) United States Patent
Wedig

(10) Patent No.: US 11,275,433 B2
(45) Date of Patent: Mar. 15, 2022

(54) HEAD SCAN ALIGNMENT USING OCULAR REGISTRATION

(71) Applicant: MAGIC LEAP, INC., Plantation, FL (US)

(72) Inventor: Geoffrey Wedig, Torrance, CA (US)

(73) Assignee: Magic Leap, Inc., Plantation, FL (US)

( * ) Notice: Subject to any disclaimer, the term of this patent is extended or adjusted under 35 U.S.C. 154(b) by 459 days.

(21) Appl. No.: 16/280,740

(22) Filed: Feb. 20, 2019

(65) Prior Publication Data
US 2019/0265783 A1 Aug. 29, 2019

Related U.S. Application Data

(60) Provisional application No. 62/636,695, filed on Feb. 28, 2018.

(51) Int. Cl.
*G06K 9/00* (2006.01)
*G06F 3/01* (2006.01)
(Continued)

(52) U.S. Cl.
CPC ........... *G06F 3/012* (2013.01); *G02B 27/017* (2013.01); *G06F 3/013* (2013.01); *G06T 19/006* (2013.01);
(Continued)

(58) Field of Classification Search
CPC ....... G06F 3/012; G06F 3/013; G02B 27/017; G02B 2027/0127; G02B 2027/014;
(Continued)

(56) References Cited

U.S. PATENT DOCUMENTS 6,433,760 B1 8/2002 Vaissie et al.
6,850,221 B1 2/2005 Tickle
(Continued)

FOREIGN PATENT DOCUMENTS

WO WO 2019/168723 9/2019

OTHER PUBLICATIONS

Peng et al., "A Recurrent Encoder-Decoder Network for Sequential Face Alignment," In ECCV, arXiv:1608.05477v2 [cs.CV] Aug. 23, 2016.
(Continued)

*Primary Examiner* — Abdul-Samad A Adediran
(74) *Attorney, Agent, or Firm* — Knobbe, Martens, Olson & Bear, LLP

(57) ABSTRACT

Methods and systems for aligning head scans of a subject for a virtual avatar can be based on locating eyes of the subject in the scans. After one or more eyeball models are fitted to reference candidate points of a sclera of each eyeball of the subject in a reference head scan, an additional reference point can be inferred from the eyeball models. The eyeball models can be fitted to candidate points of the sclera of each eyeball of the subject in another head scan and an additional point can be inferred from the fitted eyeball models. An affine transformation can be determined between the head scans based on the eyeball models fitted to the candidate points in the reference head scan and the other head scan and the additional points inferred. The methods and systems can be used for rigging or animating the virtual avatar.

31 Claims, 20 Drawing Sheets

(51) Int. Cl.

| | |
|---|---|
| *G06T 19/00* | (2011.01) |
| *G02B 27/01* | (2006.01) |
| *G06V 40/19* | (2022.01) |
| *G02B 3/14* | (2006.01) |
| *G06V 40/16* | (2022.01) |

(52) U.S. Cl.
CPC ............... *G06V 40/19* (2022.01); *G02B 3/14* (2013.01); *G02B 2027/014* (2013.01); *G02B 2027/0127* (2013.01); *G02B 2027/0174* (2013.01); *G02B 2027/0187* (2013.01); *G06V 40/165* (2022.01)

(58) Field of Classification Search
CPC .... G02B 2027/0174; G02B 2027/0187; G06T 19/006; G06K 9/00248; G06K 9/00604
See application file for complete search history.

(56) References Cited

U.S. PATENT DOCUMENTS

| | | | |
|---|---|---|---|
| 7,020,305 | B2 | 3/2006 | Liu et al. |
| 8,872,832 | B2 | 10/2014 | Robie et al. |
| 9,081,426 | B2 | 7/2015 | Armstrong |
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 2006/0028436 | A1 | 2/2006 | Armstrong |
| 2007/0081123 | A1 | 4/2007 | Lewis |
| 2012/0050493 | A1 | 3/2012 | Ernst et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0202756 | A1 | 7/2016 | Wu et al. |
| 2017/0293354 | A1* | 10/2017 | Lu ...................... G06K 9/00604 |
| 2018/0005018 | A1 | 1/2018 | Young et al. |

OTHER PUBLICATIONS

International Search Report and Written Opinion, re PCT Application No. PCT/US2019/018815, dated May 1, 2019.
Hansen, D. et al., "In the Eye of the Beholder: A Survey of Models for Eyes and Gaze", IEEE Transactions on Pattern Analysis and Machine Intelligence, vol. 32, No. 3, , Mar. 2010, in 23 pages.
Wood et al., "Rendering of eyes for eye-shape registration and gaze estimation," In Proceedings of the IEEE International Conference on Computer Vision, Dec. 13, 2015, Retrieved on Apr. 15, 2019 from <https://ieeexplore.ieee.org/abstract/document/7410785>, in 10 pages.
Valenti et al., "Combining Head Pose and Eye Location Information for Gaze Estimation," IEEE Transactions On Image Processing, vol. 21, No. 2, Feb. 2012, in 14 pages.
Beeler et al., "Rigid Stabilization of Facial Expressions," ACM (TOG) vol. 33, Issue 4, Jul. 2014, article No. 44.
Cao, X. et al., "Face Alignment by E plicit Shape Regression" International Journal of Computer Vision, Dec. 2013, in 14 pages.
Sumner et al., "Deformation Transfer for Triangle Meshes," SIGGRAPH 2004, Aug. 2004.
International Preliminary Report for Patentability, re PCT Application No. PCT/US2019/018815, dated Sep. 1, 2020.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Casas, et al., "Rapid Photorealistic Blendshape Modeling from RGB-D Sensors," Computer Animation and Social Agents, ACM May 23, 2016.
Cheung, et al., "Synthesizing Frontal Faces on Calibrated Stereo Cameras for Face Recognition," ICB 2009, LNCS 5558, pp. 347-356, 2009.
Wang, et al., "Realtime 3D Eye Gaze Animation Using a Single RGB Camera," ACM Trans. Graph., vol. 35, No. 4, Article 118, Jul. 2016.
Zhao, et al., "Mask-off: synthesizing Face Images in the Presence of Head-Mounted Displays," arZiv:1610.08481v2 [cs.CV] Oct. 27, 2016.

* cited by examiner

HEAD SCAN ALIGNMENT USING OCULAR REGISTRATION

CROSS-REFERENCE TO RELATED APPLICATIONS

This application claims the benefit of priority to U.S. Provisional Patent Application No. 62/636,695, filed on Feb. 28, 2018, entitled "HEAD SCAN ALIGNMENT USING OCULAR REGISTRATION," which is hereby incorporated by reference herein in its entirety.

FIELD

The present disclosure relates to virtual reality and augmented reality, including mixed reality, imaging and visualization systems and more particularly to rigging systems and methods for animating virtual characters, such as avatars, and for processing image scans of subjects for avatars.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Imaging scans of a subject performing a variety of poses can be generated to create a lifelike, three-dimensional (3D), virtual representation (e.g., an avatar) of the subject. The scans are typically taken while the subject performs training poses that show different facial expressions of the subject (e.g., smiling, frowning, winking, being surprised, etc.). The scans can be used to animate a virtual avatar for the subject. A disadvantage that may be encountered is movement of the subject's head between imaging scans for the different training poses. Such movements, if not stabilized or compensated for, can lead to an unpleasant, uncanny, or unnatural appearance of the avatar, because such small movements of the head as a whole are imported into the animated expressions.

Various embodiments of methods and systems for aligning head scans of a subject for a virtual avatar can be based on locating eyes of the subject in the scans. After one or more eyeball models are fitted to reference candidate points of a sclera of each eyeball of the subject in a reference head scan, an additional reference point can be inferred from the eyeball models. The eyeball models can be fitted to candidate points of the sclera of each eyeball of the subject in another head scan and an additional point can be inferred from the fitted eyeball models. An affine transformation can be determined between the head scans based on the eyeball models fitted to the candidate points in the reference head scan and the other head scan and the additional points inferred.

Embodiments of the methods and system can also be used to locate a concealed rigid shape (such as a subject's skull) by locating a non-concealed object (such as an eye) that has at least one point that is fixed relative to the location of the concealed rigid shape.

In another embodiment, aligning multiple scans of a subject's head can be obtained by fitting a visible portion of the sclera of an eye to a geometric shape (e.g., a portion of a sphere or ellipsoid) and using the geometric shape as a fixed reference point to stabilize the scans.

In various embodiments, fitting six degrees of freedom (DOFs) for a transformation of the subject's head between scans can be reduced to an automated process of fitting at least five DOFs plus one additional DOF. Fitting the one additional DOF can be performed automatically using reference points on the subject's skin or manually by an animator.

The systems and methods disclosed herein can be used in a variety of industries, including augmented, virtual, or mixed reality, gaming, visual effects (VFx), movies, and so forth.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
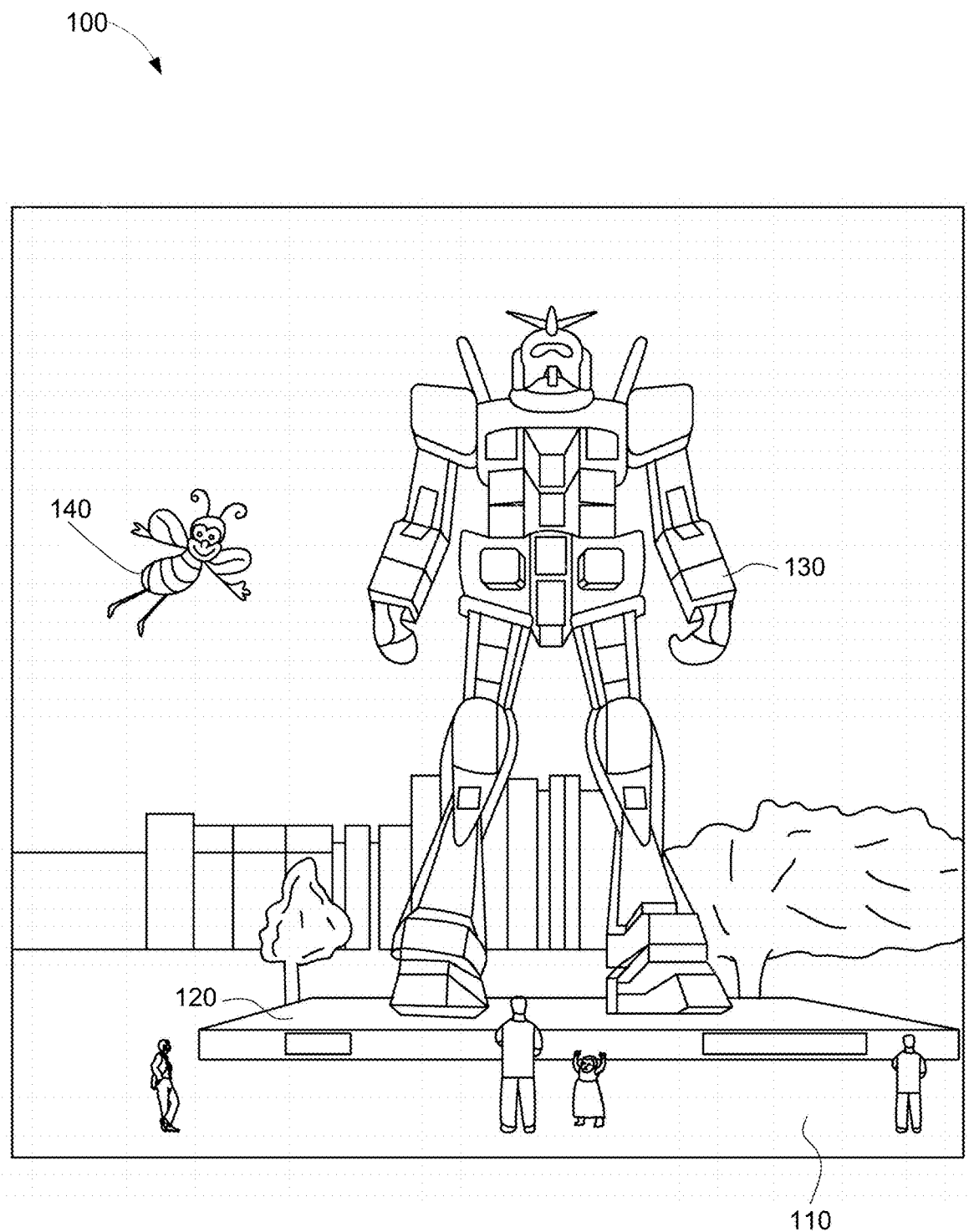
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

Embodiments of the disclosed systems and methods may provide for improved avatars and a more realistic interaction between a user of the wearable system and avatars in the user's environment. Although the examples in this disclosure describe animating a human-shaped avatar, similar techniques can also be applied to animals, fictitious creatures, objects, etc. Accordingly, the subject of the imaging scans and the alignment or stabilization techniques described herein can be a human person, an animal, or other deformable object or character. In many of the examples described herein, the subject is a person (e.g., to create a human-looking avatar) but that is for illustration and is not a limitation on the disclosed methods and systems. Further, many of the techniques described herein may be particularly advantageous for animal subjects, because animals may not understand (or obey) a command to hold still between images.

To create a convincing digital avatar of a person can require scanning the person's three-dimensional (3D) likeness to create digital geometry. The imaging scans can, for example, be taken by placing the subject in a photogrammetry capture stage comprising multiple cameras (e.g., 60, 80, 120, or more) surrounding and pointed at the subject. The cameras can be synchronized to each other to capture images that can be converted into a 3D scan of the subject performing a pose. The images (or the corresponding scans) may be referred to herein as head scans, because the images (or the corresponding scans) may include at least a portion of the head of the person. Head scans accordingly may include, e.g., only a portion of the person's head (e.g., eye regions), the entire head, the head and neck, the head, neck, and upper torso, or the entire body of the person. A head scan can include background features from the environment of the person.

For static bursts, a single scan can be generated. However for an avatar which can move and emote, scans can be taken while the subject performs training poses that include basic expressions units (e.g., smiling, frowning, etc.). These scans can be used to create a training set that is used to construct an animation rig (described below) which can be used to create a convincing digital avatar of the person in action.

One difficulty that may be encountered in this process is the problem of alignment (which is also referred to as stabilization). Each of the scans of the person can appear in a 3D space relative to one another, possibly due to small movements of the person between scan events. It can be difficult, or impossible, to eliminate such small movements entirely while performing the scans. For example, the person may be unable to hold his or her head still without any movement over multiple scans of the head, when the person performs the training poses. To facilitate the use of these scans, these small movements can be advantageously determined, reduced, minimized, or eliminated by the methods of the disclosure.

Even small movements (e.g., less than 1 mm) can cause a finished animation rig based on the scans to look unpleasant, unnatural, or uncanny, because these small movements (e.g., translations or rotations of the head or body as a whole) are incorporated into the animation rig (e.g., blendshapes used for animating the avatar). For example, if two head scans are not aligned precisely (e.g., less than 0.5 mm), an AR/MR/VR user interacting with an avatar generated from a finished rig based on the scans can distinctly notice that something is unusual or unnatural with the avatar. The user of an AR/MR/VR device may experience uncanny, eerie, or unpleasant feelings when interacting with such an avatar. Operators can manually align head scans, which can take 0.5 to 2.5 hours per scan or frame, which can be too long for creating a rig of a subject in many scenarios. Further, operators use human judgement and personalized techniques to align the subject's head between scans. In contrast, various embodiments of the methods disclosed herein provide automated (or at least semi-automated) alignment methods based on a computerized set of rules that can be applied to digital scans. Although the result may be the same (e.g., alignment or stabilization of the subject's head in a set of scans), the computerized technique is performed differently than the operator's methods, which rely on individual human judgement and experience.

Accordingly, embodiments of the disclosed systems and techniques can be used to quickly and automatically (or with limited or reduced human intervention) align the head of the subject between scans, which improves the animation of the resulting avatar. For example, the avatar can be rendered so as to reduce the likelihood of entering the so-called uncanny valley, which represents a dip in human emotional response to an avatar that is almost, but not quite, human in its appearance or movements.

For human subjects, the position of a rigid component of the subject, such as the skull, could be used to determine an alignment of the subject's head between scans. However, the skull is concealed by the subject's skin, which deforms during the facial expressions emoted during the training poses. Therefore, it is challenging to determine the skull's position directly from the imaging scans. Using unconcealed features such as skin features, the nose, the ears, or the forehead have been used with limited success or accuracy. As described in more detail herein, the position of the skull can be determined by using information on unconcealed features (e.g., the eyes), which are nearly rigidly fixed relative to the skull.

In some implementations, scanned data (e.g., 3D data) collected from the sclerae (the white portions) of a subject's eyes can be fitted to a model of an eyeball (e.g., a sphere or ellipsoid, or any other suitable shape) and a center point for each eye can be determined. These points can be nearly rigid relative to the skull of the subject and thus provide two of the three points needed to calculate a rigid six-degree of freedom (DOF) transformation of the head position between imaging scans of the subject. A six DOF transformation can account for the movement of a rigid component of the body (e.g., the skull) in a 3D coordinate space, e.g., three spatial translations (such as front-back, up-down, and left-right) and three angular rotations (such as yaw, pitch, and roll). The six DOF transformation can comprise an affine transformation (e.g., a linear transformation representing rotation, translation, scale change, shear, or reflection).

Aligning the eye positions to those of a reference pose, the six DOF problem can be reduced to a one DOF problem characterized as a single pivot along an axis that passes through the center points of the eyes. The final pivot can be calculated, for example, using skin-based techniques or manual techniques by an operator (e.g., an animator). In some embodiments, an affine transformation can be determined as sphere matching (in addition to center point matching) based on center points and the radii of the eyeballs. In some implementations, an affine transformation can be determined by matching geometric shapes of exposed parts of sclerae of the eyes for alignment.

In some embodiments, each scan can be transformed using a six-degree of freedom affine transformation so that the position of the rigid component of the person's head (e.g., the skull) matches that of a common reference pose. The common reference pose can be a relaxed, neutral expression of the person. Since the skull is not actually visible, its position can be inferred from information present in the scan. The primary information in the scan, the skin of the face, deforms between scans, making it less suitable for determining the transformation at the level of quality needed for many imaging scan implementations.

The alignment problem can be particularly challenging (e.g., for human subjects) due to the degree of deformation of the visible portions of the face. Seeing beyond that to the underlying structure can be difficult even for skilled operators. In addition, the six degrees of freedom interact in complex ways, making it difficult to ascertain whether a translation or rotation is appropriate for a given alignment problem.

A six-degree of freedom affine transformation can be calculated using only three points which have been rigidly transformed between two or more scans (e.g., a reference scan and one or more additional scans which can be used to construct the animation rig). In the case of a scanned human head, no such points that are directly visible in the scan exist, because the skull is concealed by the subject's skin, which deforms during the poses. The alignment methods disclosed herein can be based on ocular registration by inferring eyeball centers of eyes of a user in head scans from sclerae of the eyes of the user and aligning the head scans using the inferred eyeball centers.

However, because eyes are shiny, scans can be noisy because reflections in eyes are different for different cameras. Furthermore, reflectance of eyes can have subsurface scatter, which creates noise. In some embodiments, the ocular alignment methods of the disclosure can be used to align head scans that are noisy. In some implementations, the ocular alignment methods do not require a person whose avatar is being created to wear powder makeup, which can help to eliminate the subsurface scatter. After all, it is not possible to put makeup on the eyes.

In some embodiments, the ocular alignment methods disclosed herein have one or more advantages over other methods based on tracking points such as the bridge of the nose, the forehead, points behind the ears, etc. at least in part because these points all move to some greater or lesser degrees during poses. In some implementations, the ocular alignment methods have higher accuracy compared to alignment techniques based on directly tracking candidate skin points. In some embodiments, the ocular alignment methods are less cumbersome and require less training (e.g., training using lower resolution or lower quality scans) than statistical or machine-learned alignment techniques that predict skin motion and thus infer skull position. The ocular alignment method may not require time consuming hand alignment before the method can be used in production. The ocular alignment methods of the disclosure can be simple, accurate, fast or easy to implement. In some embodiments, alignments determined using the ocular alignment methods can be easily modified or improved (e.g., by an operator or animator) because the difficult six degrees of freedom (DOF) problem has been simplified to a more tractable one degree of freedom one. The ocular alignment methods have additional applications in computer graphics and visual effects processes (e.g., for movie production). The ocular alignment method can be used for fully automated or semi-automated alignments of head scans (e.g., in which some operator input is used such as for the one DOF transformation).

The systems and methods disclosed herein can be used in a variety of industries, including augmented, virtual, or mixed reality, gaming, visual effects (VFx), movies, and so forth.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
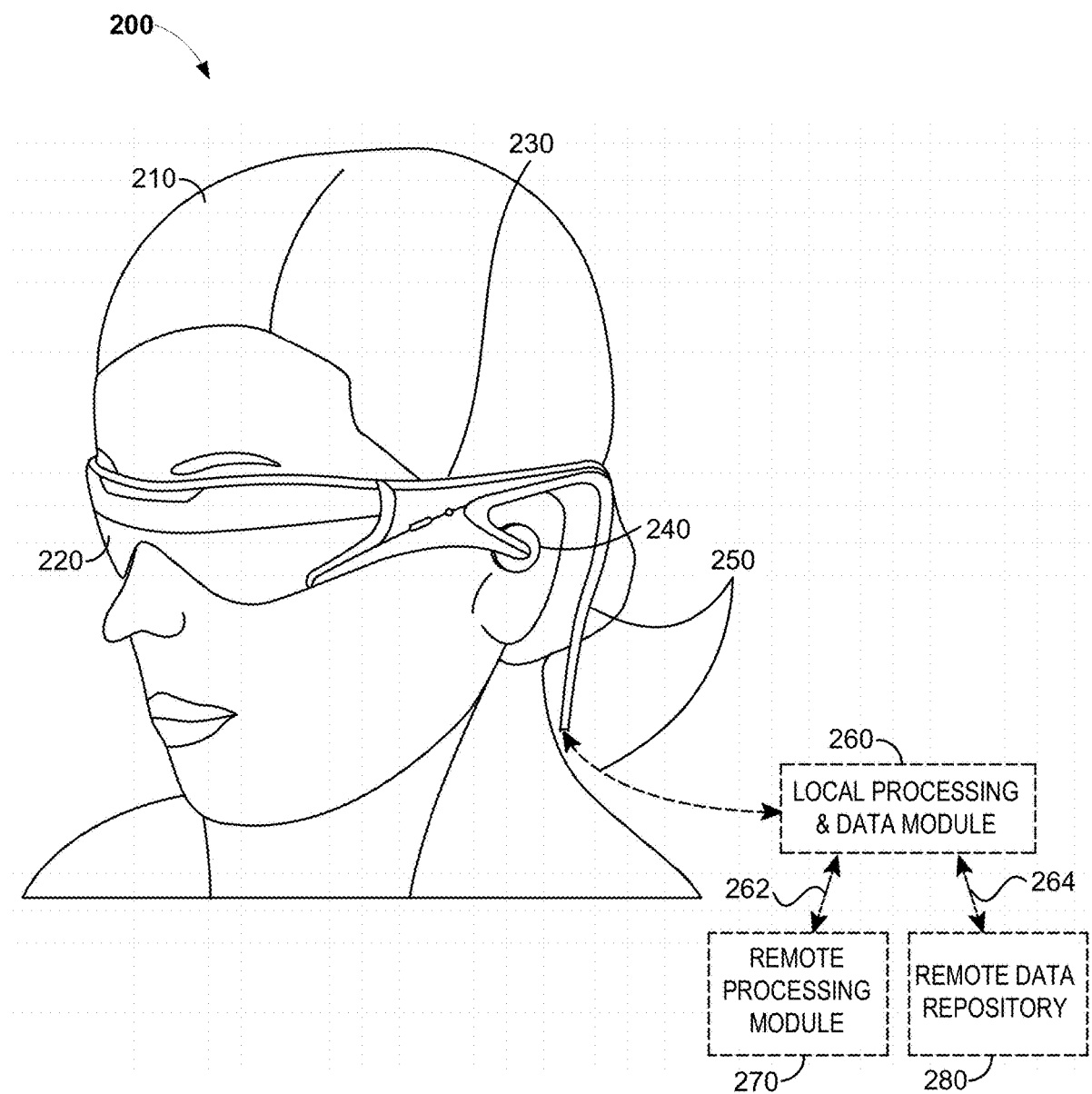
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of A Wearable System

Figure 3:
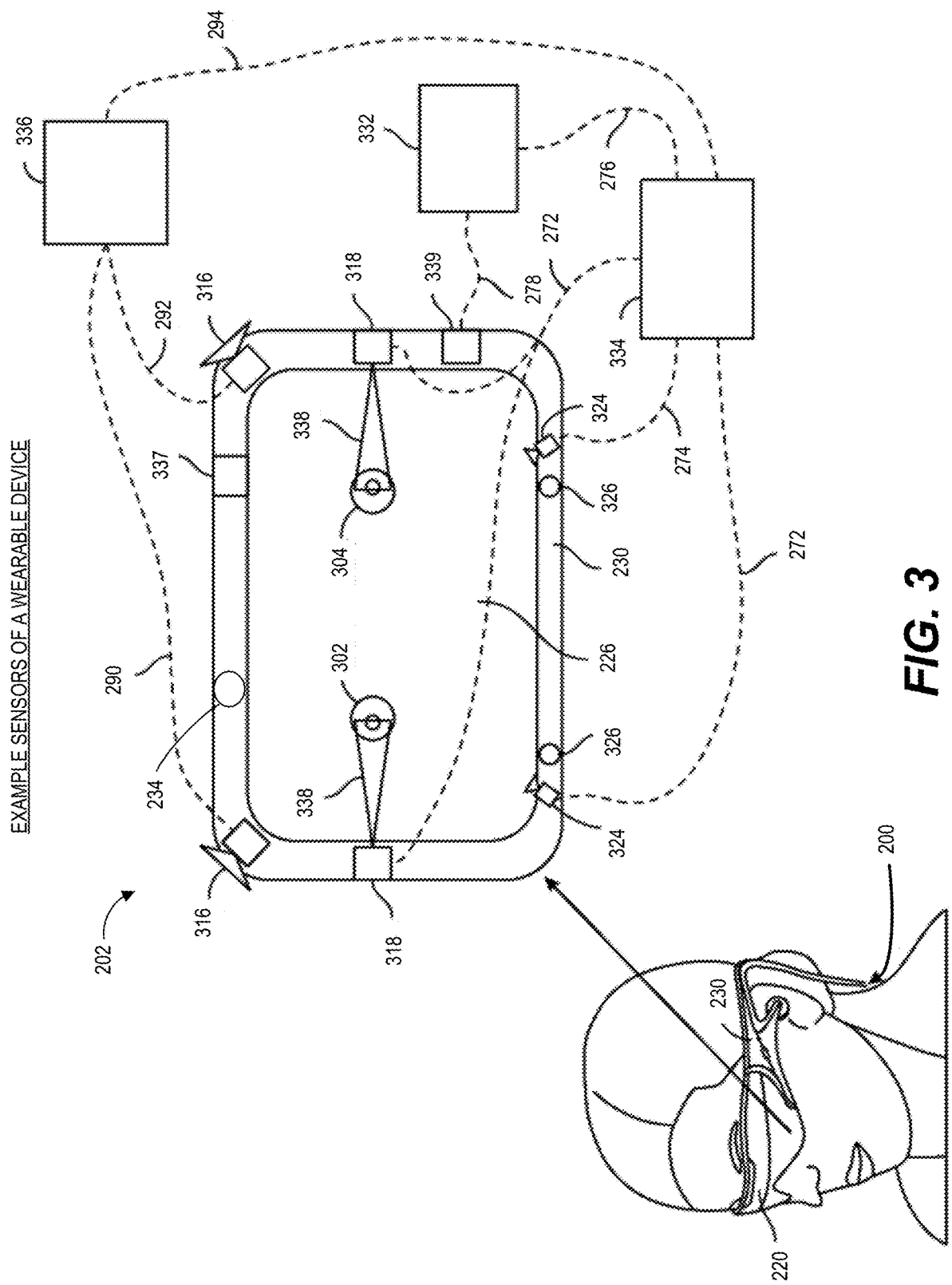
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
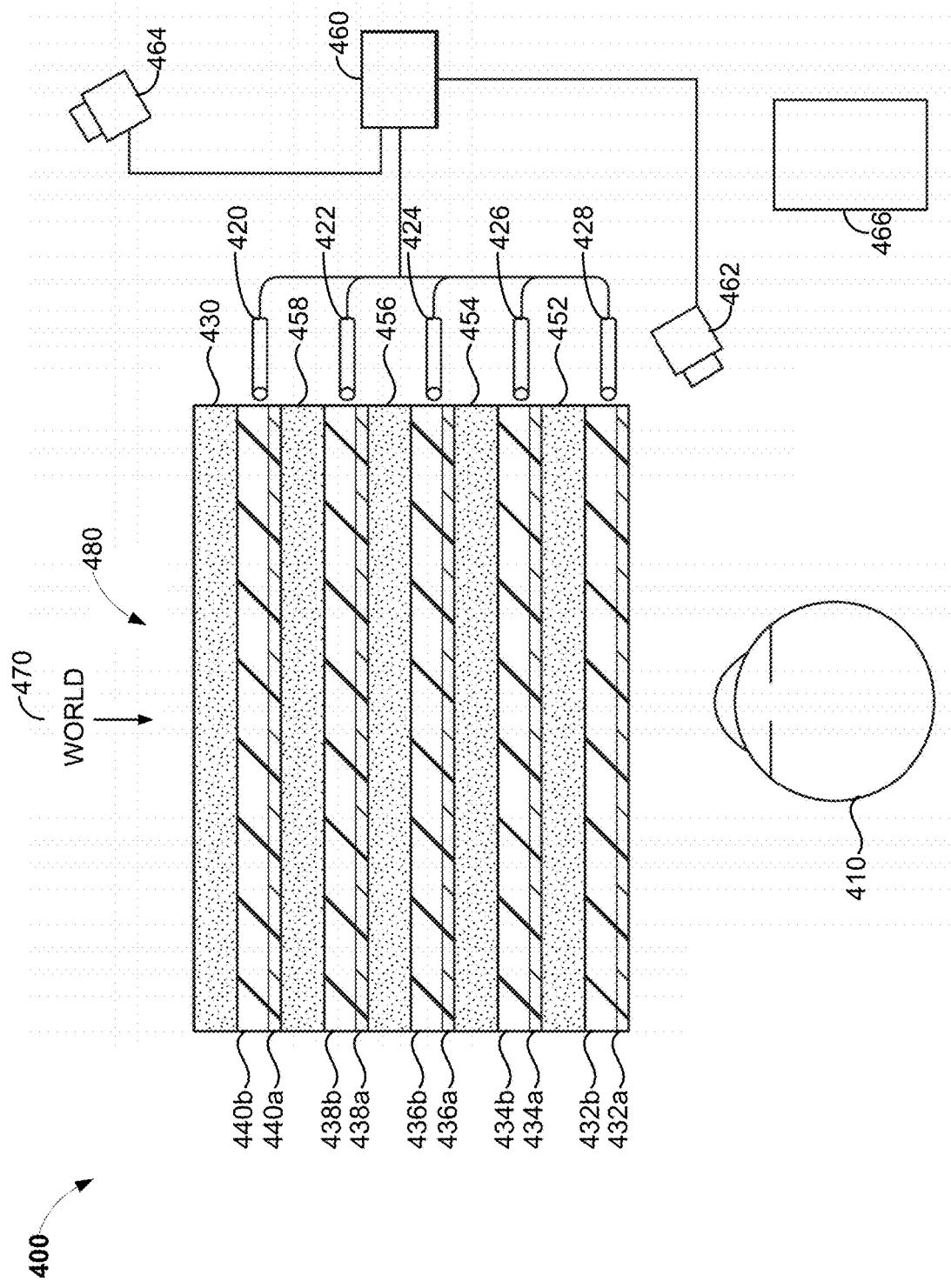
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
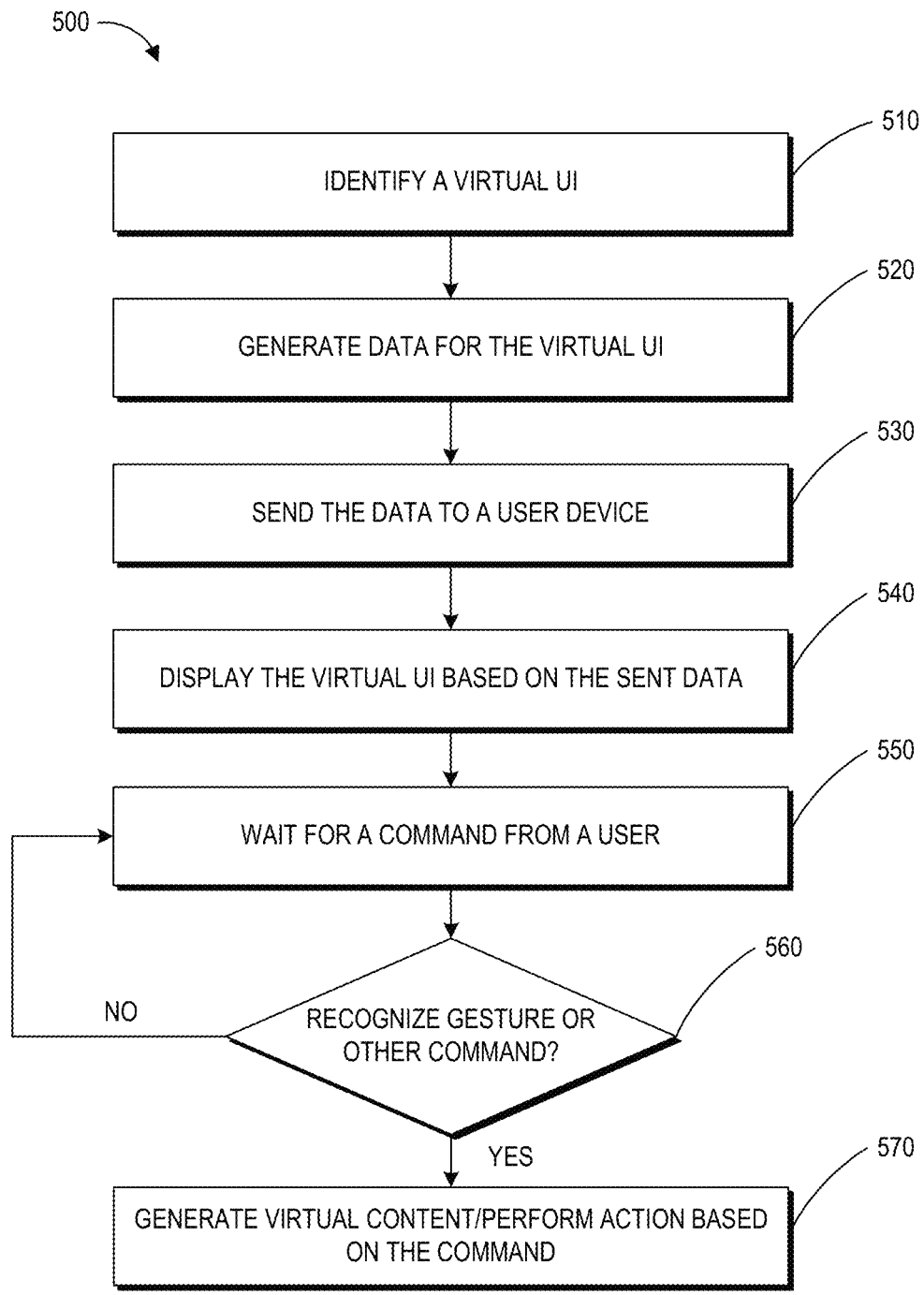
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
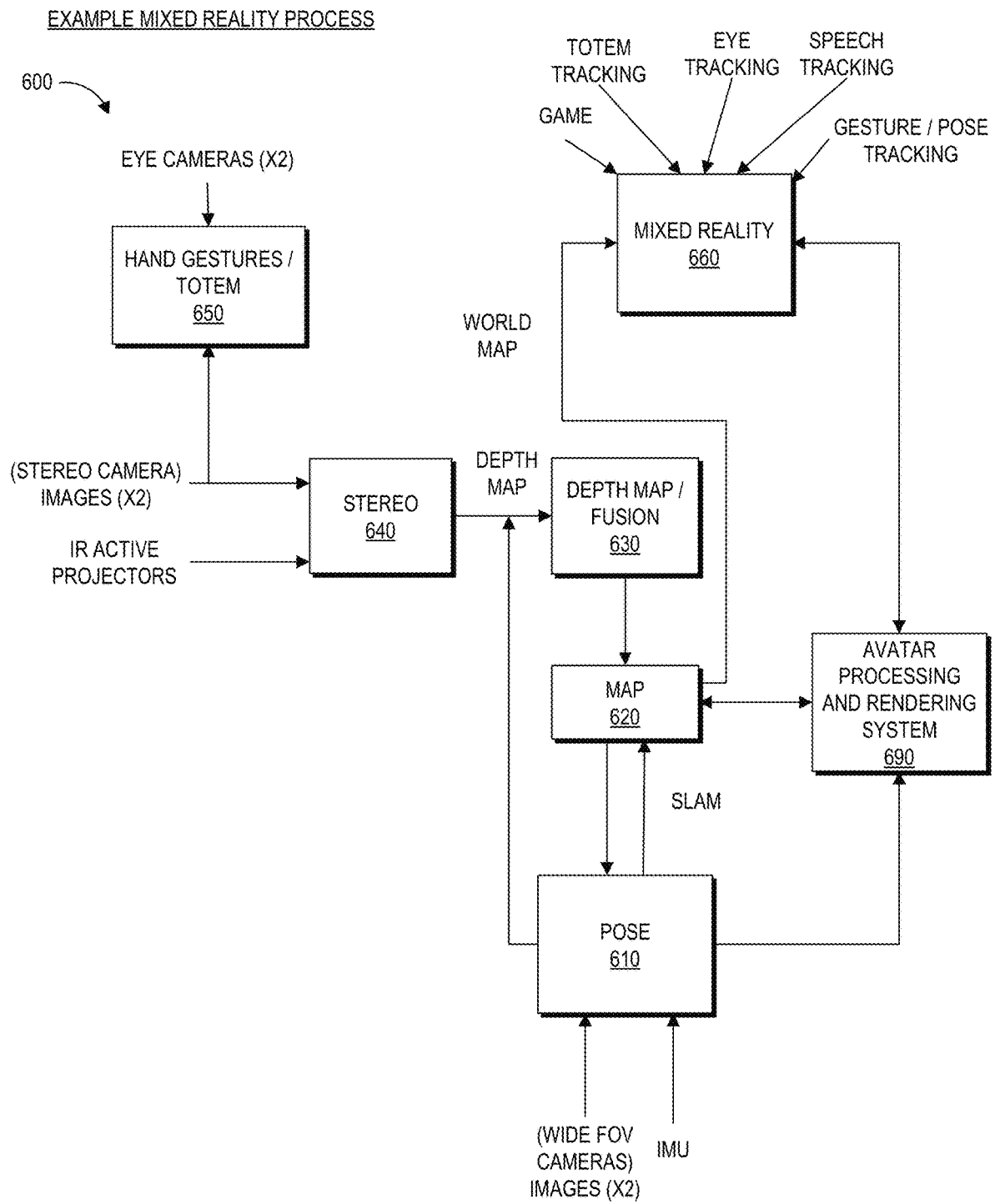
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
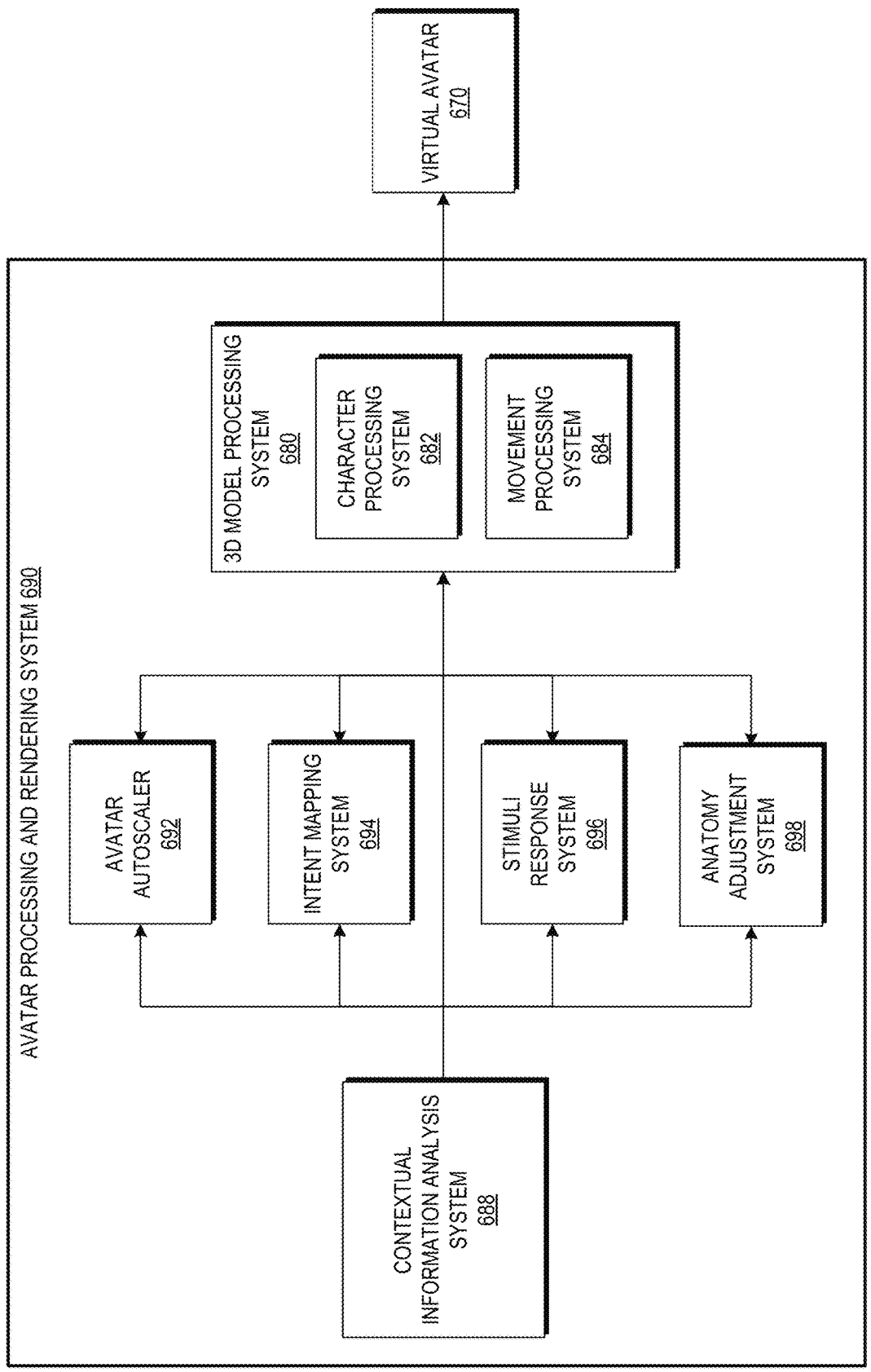
FIG. 6B illustrates example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
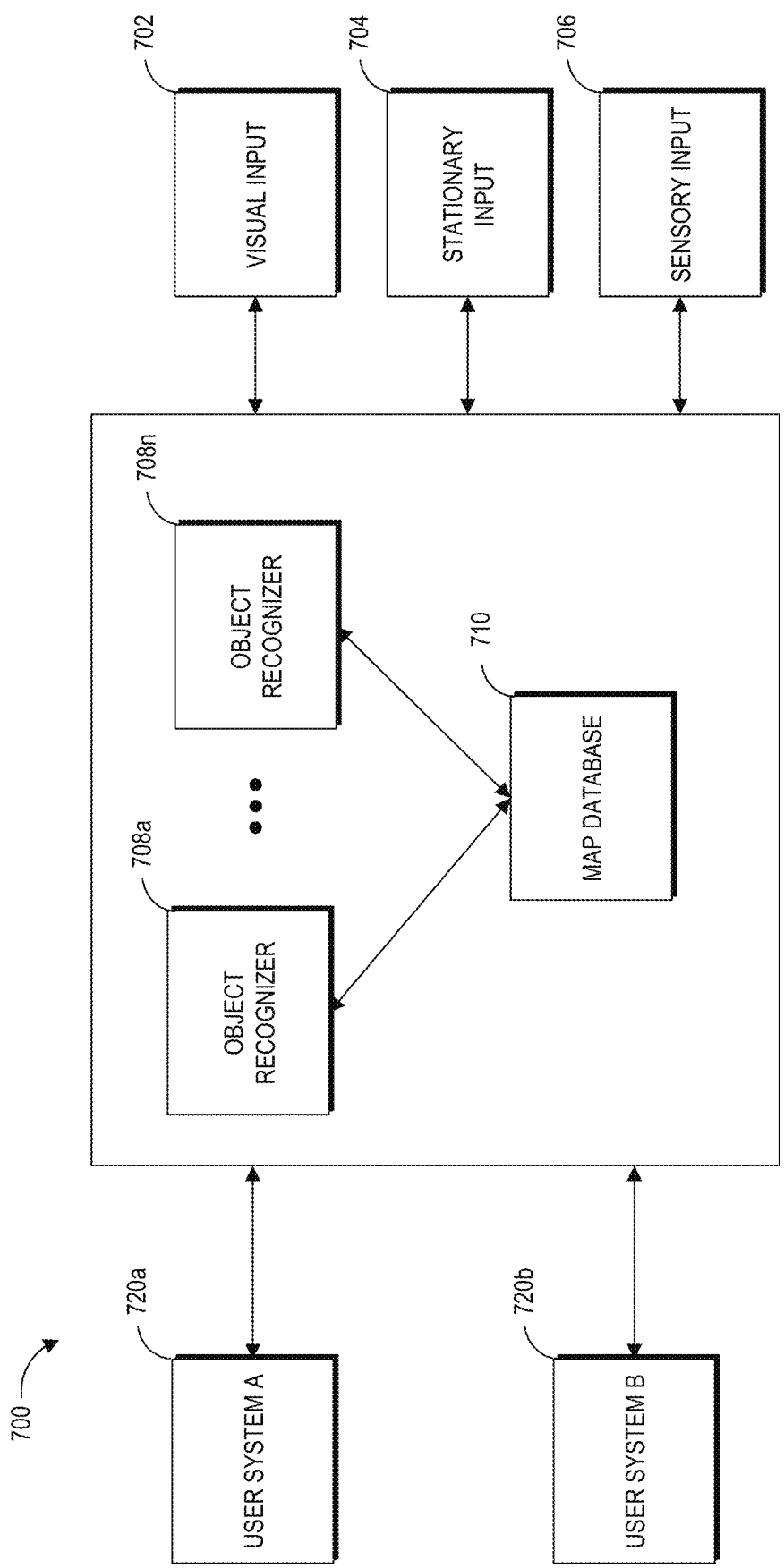
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth. Some or all of these computer vision algorithms can be used in the ocular registration techniques described below (see, e.g., FIGS. 11A-17), e.g., to identify sclera from scans of a subject's eyes.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values. Some or all of these machine learning algorithms can be used in the ocular registration techniques described below (see, e.g., FIGS. 11A-17), e.g., to identify sclera from scans of a subject's eyes.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
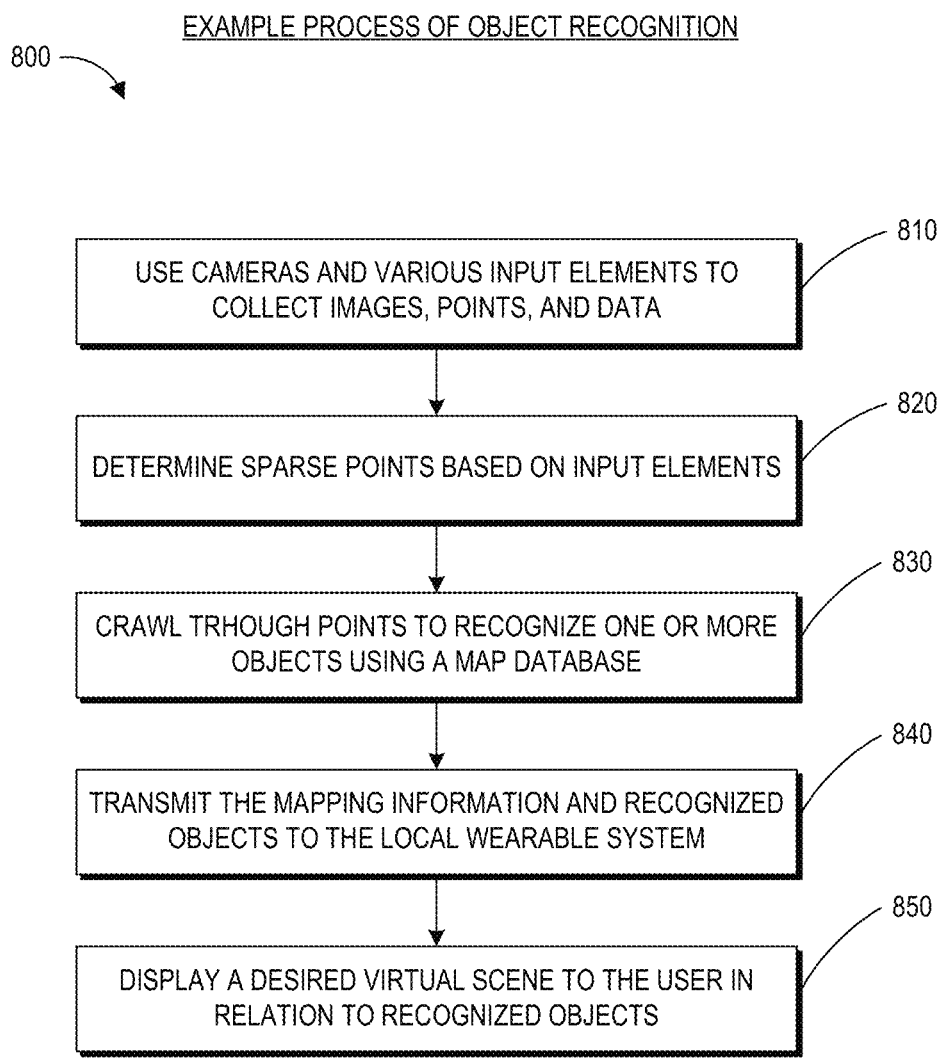
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
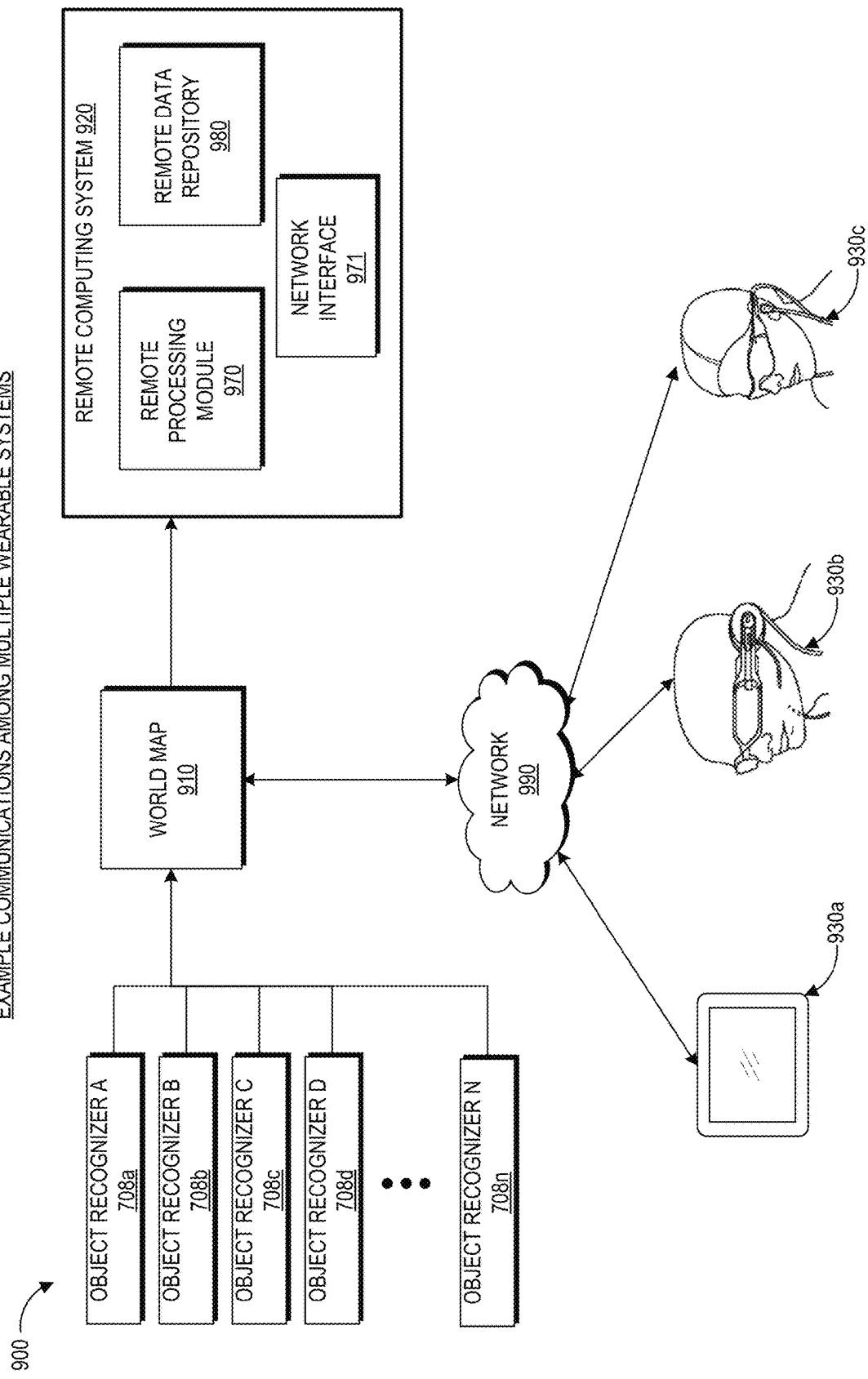
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930*b* and 930*c* may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708*a*, 708*b*, 708*c* . . . 708*n*) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930*a*, 930*b*, 930*c*) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930*a*, 930*b*, 930*c*) to process information about the user and the user's environment. The remote computing system 920 can modify the information acquired by the user devices (e.g. 930*a*, 930*b*, 930*c*), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

Figure 9B:
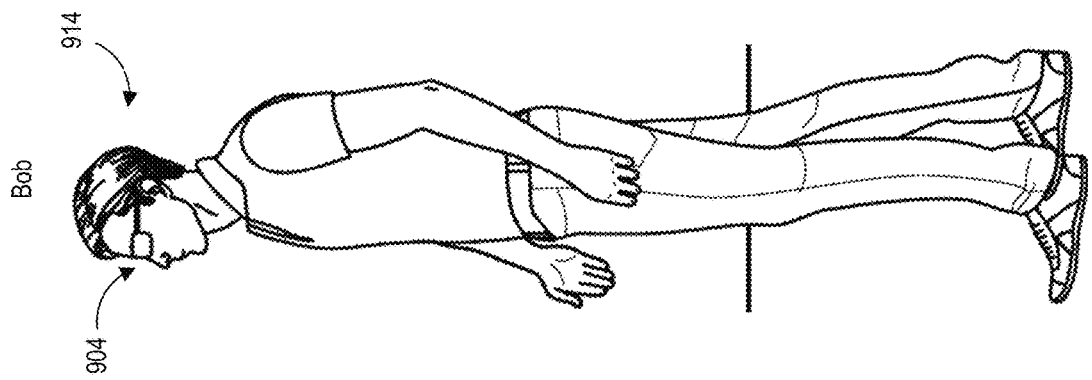
FIG. 9B illustrates an example telepresence session.
Figure 9B:
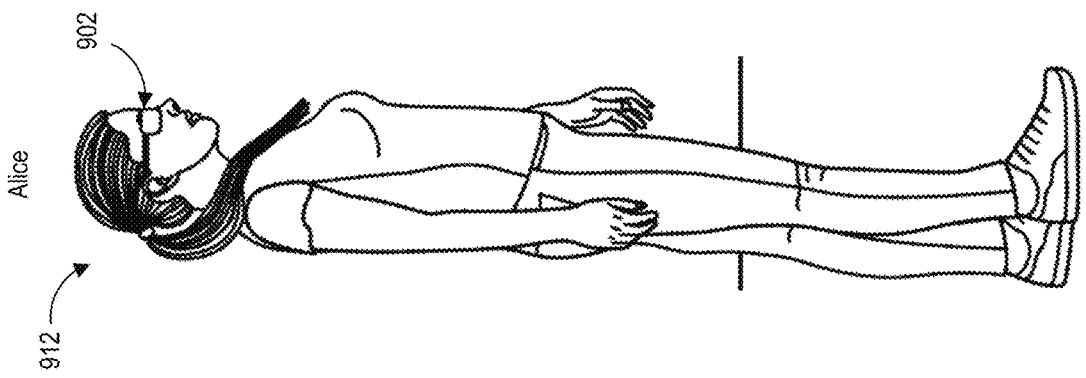

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

Figure 10:
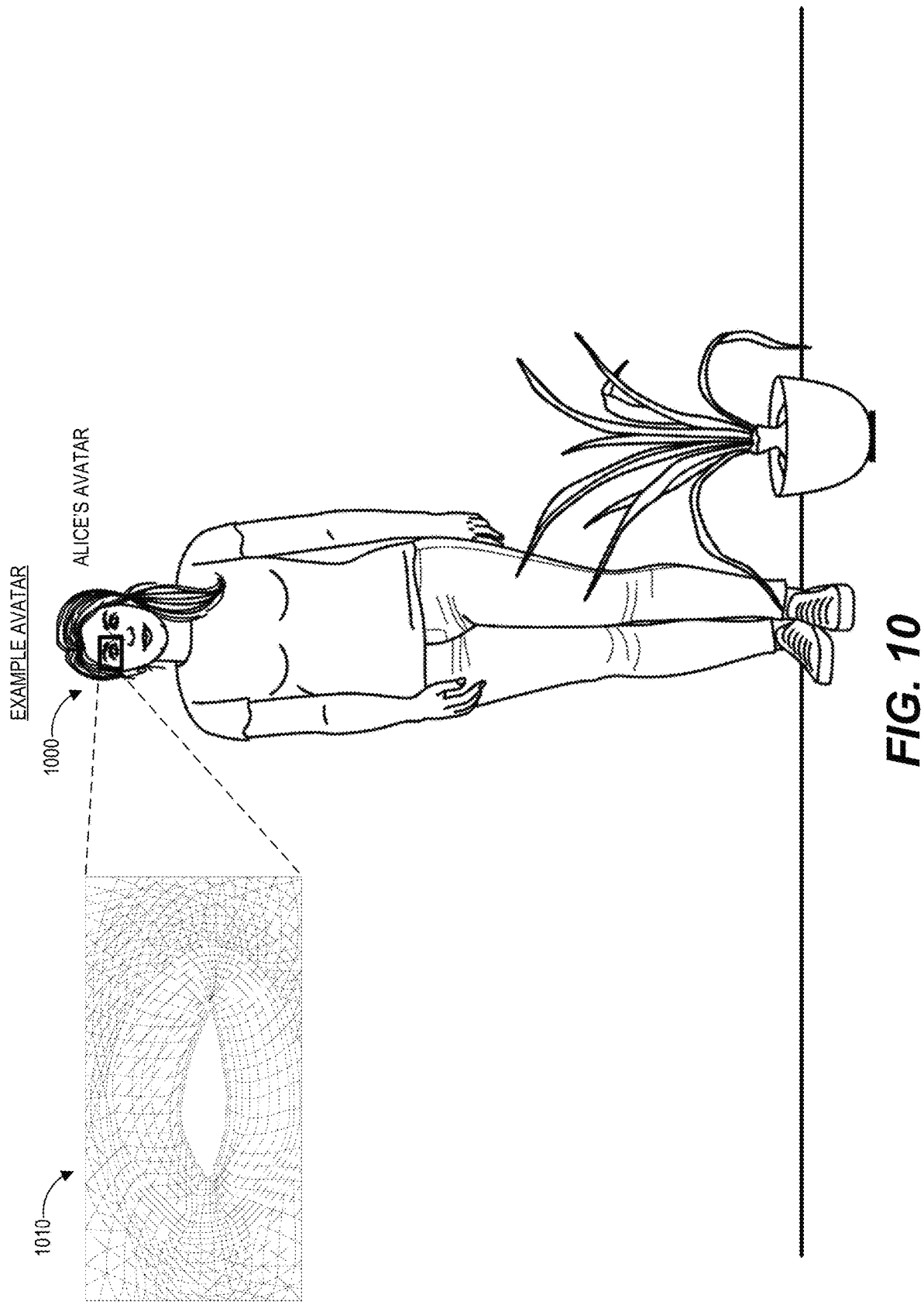
FIG. 10 illustrates an example of an avatar as perceived by a user of a wearable system.

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

The goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system 200, while making as few compromises to the final quality as possible. In some embodiments, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Example Geometry of a Subject's Head and Eyes

In some implementations, the methods can include locating a concealed rigid shape (e.g., the skull of the subject) by locating a non-concealed object that has at least one point at a substantially fixed relative location to the concealed rigid shape (e.g., an eye of the subject). The methods can include aligning multiple scans of the subject's head using the eyes as fixed reference points. The methods can include aligning multiple scans of the subject's head by fitting the visible portion of the sclera to a geometric shape (e.g., a sphere or ellipsoid, or any other suitable shapes) and using the geometric shape as a fixed reference point. In some implementations, the problem of manual six DOF fitting of a geometric shape to a scan of an eye is provided by automating at least five DOF so only one DOF at most is required manually.

Figure 11A:
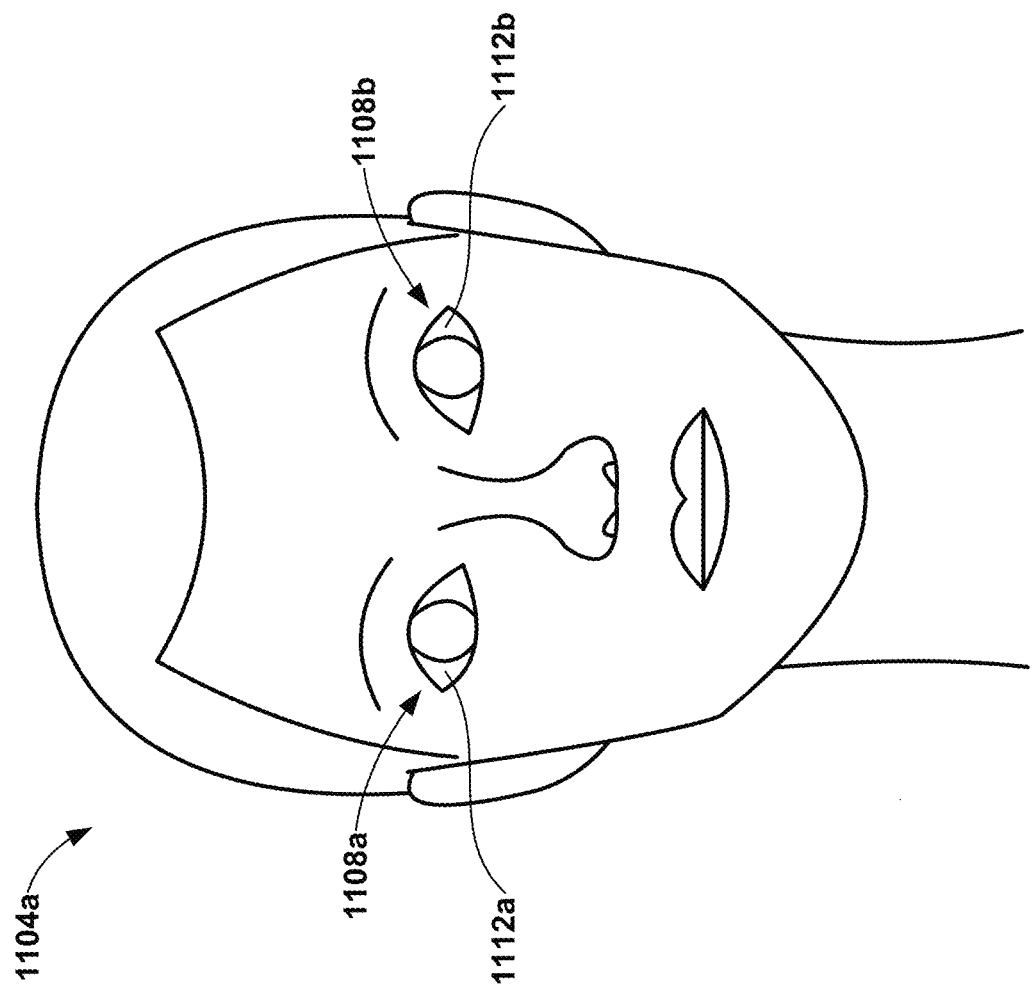
FIG. 11A schematically illustrates an example of a head of a subject whose animation rig is being generated.
Figure 11A:
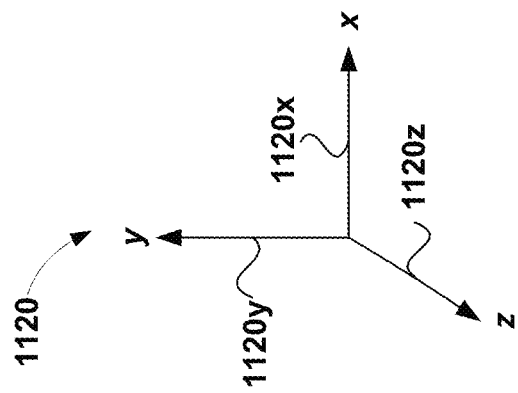

The head scans of the user can be aligned to a reference head scan which includes a reference head pose of the person. For example, the reference head scan can include a relaxed, neutral expression of the subject. FIG. 11A schematically illustrates an example head 1104a of a subject whose rig is being generated. In some embodiments, each head scan can be transformed using a six-degree of freedom affine transformation so that the position of a rigid component of the person's head (e.g., the skull 1104b in FIG. 11B) matches that of the reference pose. Since the skull 1104b is not actually visible, its position can be inferred from information present in a scan of the head 1104a of the subject. The skin of the subject's face, which provides the primary information in the scan, deforms between scans, making its use for determining the transformation inadequate at the level of quality needed to generate rigs for avatars. In some embodiments, the reference head scan can be a single scan from a plurality of scans that functions as a basis for comparison for the rest of the scans or is designated or labeled as a reference scan.

A six-degree of freedom affine transformation can be calculated between the head scans using three or more points which have been rigidly transformed between two or more scans (e.g., a reference scan and one or more additional scans which can be used to construct the animation rig). In the case of a scanned human head 1104a, no such points that are directly visible in the scan exist because the skull 1104b is covered by the skin of the face. The alignment methods disclosed herein can be based on ocular registration by inferring centers of eyeballs 1108a, 1108b of a subject from sclerae 1112a, 1112b of the eyes of the subject in head scans and aligning the head scans using the inferred eyeball centers. The eyeball centers of the eyes can be relatively constant with respect to the skull 1104b, because the eyeballs' positions are relatively constant with respect to the eye sockets 1116a, 1116b.

Figure 11B:
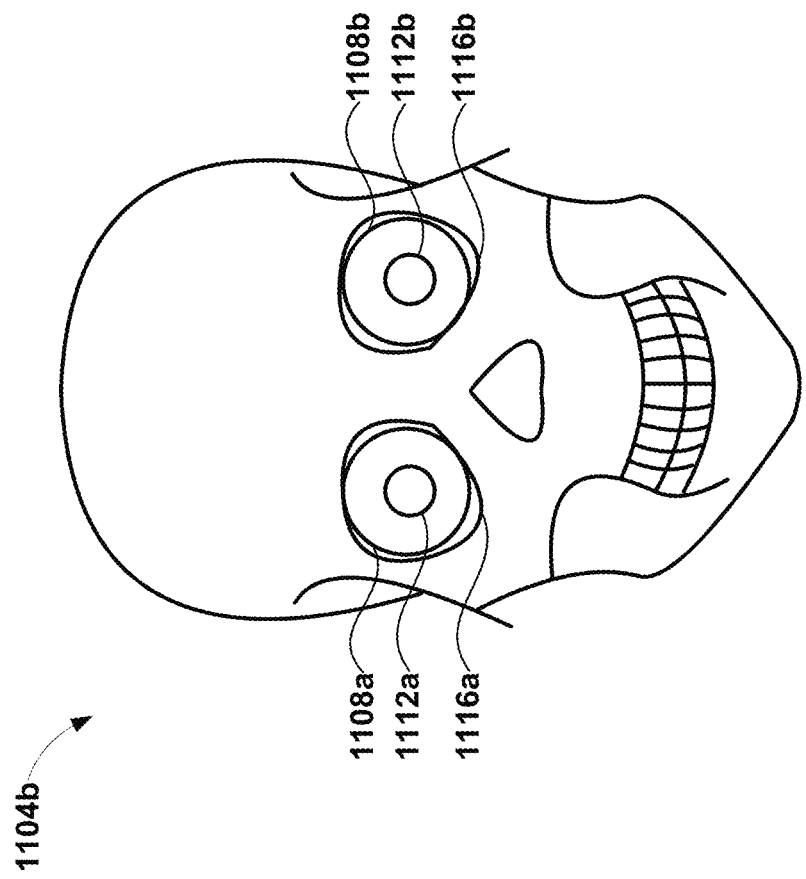
FIG. 11B schematically illustrates an example skull of the subject, which is a rigid component of the subject's head. The position of the skull or a portion of the subject's head which has at least one fixed point relative to the skull can be used to stabilize the subject's head between imaging scans.
Figure 11B:
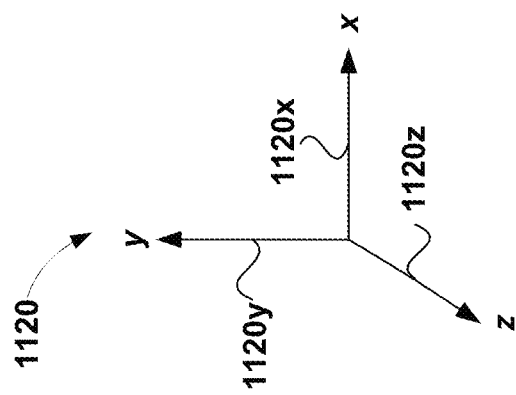

FIGS. 11A and 11B show a coordinate system 1120 (e.g., the world coordinate system, or the scanner coordinate system) in which the head scans of the subject's head 1104a can be generated. In this coordinate system, the length of the subject's head 1104a in a head scan (e.g., a reference head scan) can be approximately parallel to the direction of the y-axis 1120y. The width of the user's head 1104a in the head scan can be approximately parallel to the direction of the x-axis 1120x. The depth of the user's head 1104b in the head scan can be approximately parallel to the direction of the z-axis 1120z. Other suitable coordinate systems and alignment methods may be used.

Example Eye, Eye Scan, and Candidate Points Selection

Figure 12:
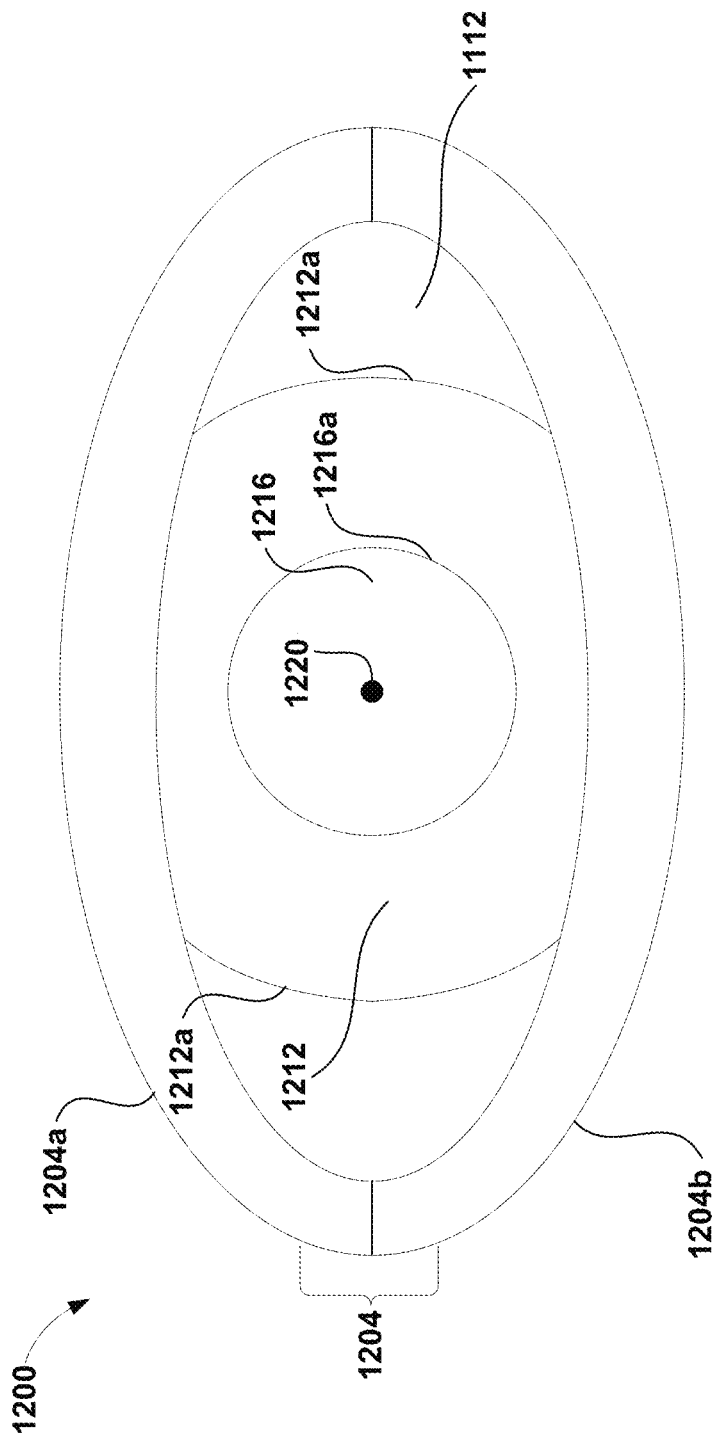
FIG. 12 schematically illustrates an example of an eye.

FIG. 12 schematically illustrates an eye 1200 of an eyeball 1108a, 1108b with eyelids 1204, sclera 1112 (the "white" of the eye), iris 1212, and pupil 1216. Curve 1216a shows the pupillary boundary between the pupil 1216 and the iris 1212, and curve 1212a shows the limbic boundary between the iris 1212 and the sclera 1112. The eyelids 1204 include an upper eyelid 1204a and a lower eyelid 1204b. The eye pose 1220 of the eye 1200 in the resting position of the eye 1200 can be approximately perpendicular to the plane of the eye shown in FIG. 12.

Figure 13:
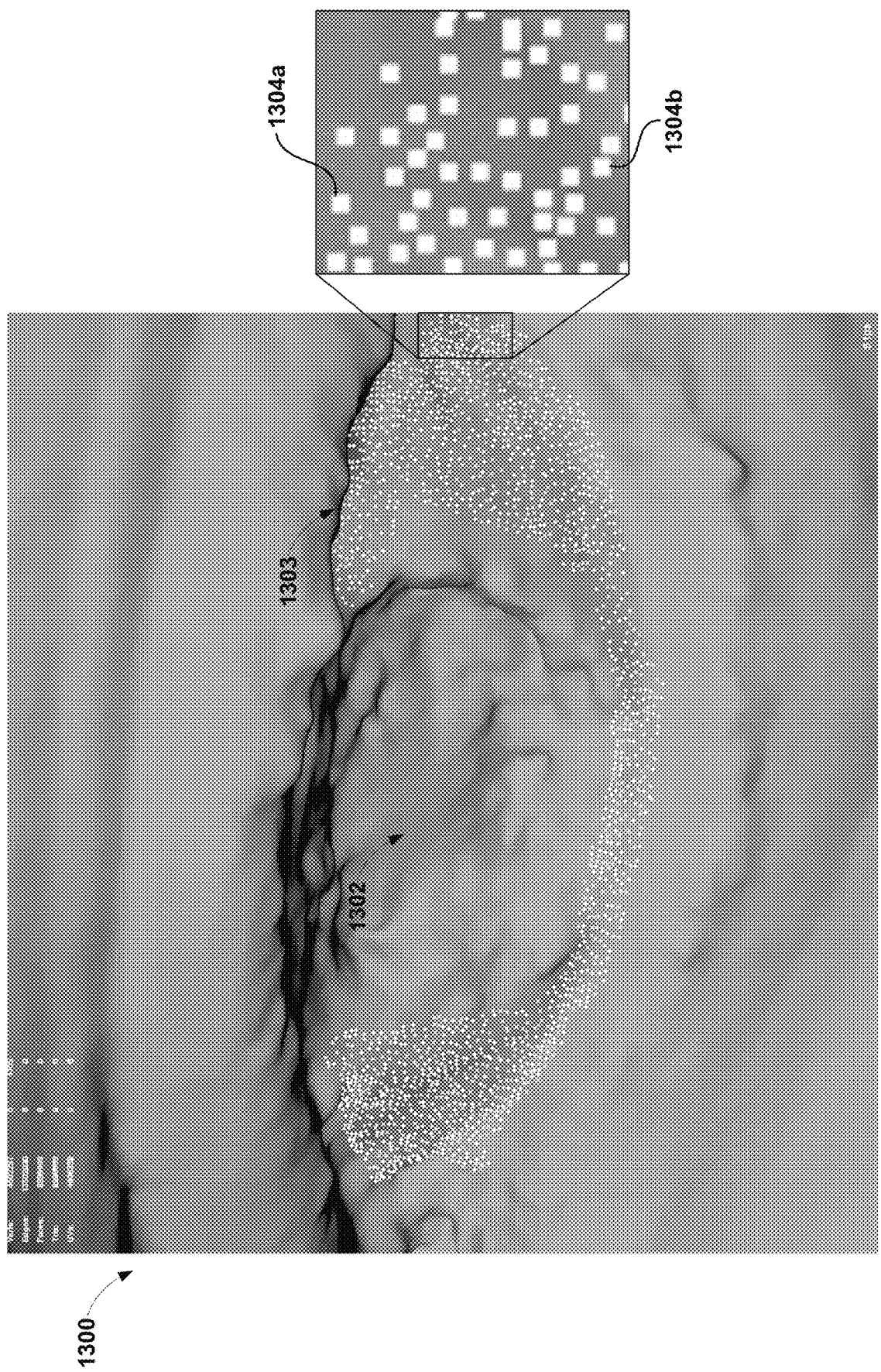
FIG. 13 shows a portion of a sclera of an eye of a subject taken during a head scan of the subject.

FIG. 13 shows an example of an eye scan 1300 showing a portion of the sclera 1303 and pupil 1302 of a subject. The eye scan 1300 can have high precision (e.g., sub-millimeter precision) and sufficient details, even on shiny or polished surfaces. While still noisy, much of the eye's surface can be preserved in the digital scan 1300 of the eye. Candidate points (also referred to as candidate vertices) can be selected for the sclera of each eye and are shown as white dots (e.g., the points 1304a, 1304b) in FIG. 13. In some embodiments, the candidate points in the eye scan 1300 (e.g., the points 1304a, 1304b) can be selected using one or more computer vision techniques (e.g., computer vision techniques based on machine learning), manually, or in some other fashion. For example, the candidate points in the eye scan 1300 can be determined based on limbic boundaries 1212a of the eye in the eye scan 1300 and shapes of the eyelids 1204a, 1204b. The limbic boundaries 1212a and the eyelids 1204a, 1204b of the eye can be determined using one or more computer vision techniques (e.g., computer vision techniques based on derivatives, such as second derivatives or higher derivatives, of the eye scan 1300). Since noise is common in these regions, the selection can be assumed to be of limited quality and can include outliers from the pupil, eyelids, caruncle, etc. In some embodiments, an eye scan be include a point cloud, a mesh, a red green blue-depth (RGB-D) image, or any group of xyz coordinates of an object.

Example Eye Fitting Procedures

Figure 14:
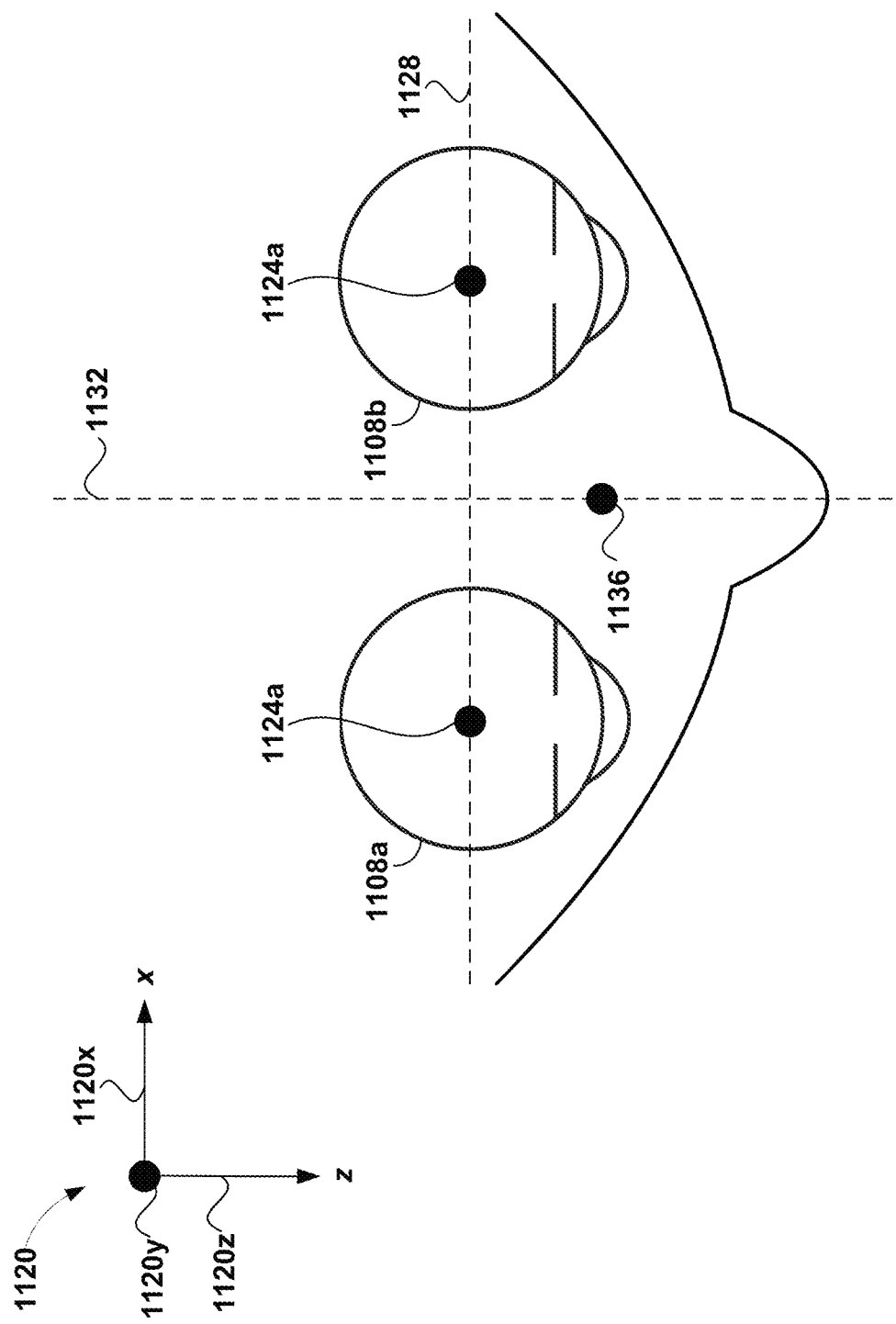
FIG. 14 schematically illustrates a cross-section of a plane passing through the eyes of a subject. The figure schematically shows examples of center points of the eyes of a subject's head and a third point of the subject's head, which can be used to determine a transformation between the subject's head positions in two different head scans.

FIG. 14 schematically illustrates an example process of determining center points of the eyes of a subject's head in a head scan and a third point of the user's head in the head scan. A model of an eyeball 1108a, 1108b can be fitted to candidate points (e.g., the candidate points 1304a, 1304b described with reference to FIG. 13). The model can be based on a geometric shape, such as a sphere or an ellipsoid. Fitting the candidate points of an eye of the subject can include determining a center position and radius (or radii for an eyeball model based on an ellipsoid) that reduces or minimizes the distance from each candidate point to the surface of the sphere (or ellipsoid or geometric shape generally). Because the selected candidate points typically include outliers and may be noisy, the data may not be normally distributed. In some embodiments, instead of reducing or minimizing the least squares of the distance from each candidate point to the surface of the geometric shape, a more robust error metric can be used during fitting to minimize the outlier and noisy effects. For example, robust regression, M-estimation, Theil-Sen estimation, random sample consensus (RANSAC) techniques can be used to fit the geometric eye shape model to the eye scan data.

Fitting the candidate points of an eye 1108a, 1108b in an eye scan to an eyeball model can include iterative culling with each step including multiple actions. After each iteration, a metric can be computed that is used to determine which candidate points are likely outliers and unlikely to be part of the actual scleral region that will give the most precise location and radius of the eyeball. The likely outliers can be culled during iteration of the fitting procedure.

In some implementations, the following actions can be performed to fit an eyeball model to candidate points of a head scan. Fitting the candidate points can include Equation 1 below. Iterative culling can include repeating Equations 1 and 2 below until convergence of the eyeball model (e.g., difference in the error statistics between iterations decrease below a convergence threshold or a maximum number of iterations) is reached.

(1) Reduce or minimize an error statistic. The error statistic can be based on the position and the radius of an eyeball model. In some embodiments, the error statistic is based on a sigmoid function. An example error statistic is shown in Equation [1] below.

$$\alpha\left(\sigma \cdot \tanh\left(\frac{x}{\sigma}\right)\right) + (1-\alpha)x, \qquad \text{Equation [1]}$$

where x denotes the residual error of the distance to the center of the eyeball model (e.g., a spherical eyeball model) compared to the expected radius, σ denotes a scaling parameter for the sigmoid function tan h, α allows for tuning between the tan h function and linear least squares, and tan h denotes the hyperbolic tangent (a sigmoid function which varies between −1.0 and +1.0 over the range ∞∞ to ∞, and is approximately linear near x=0). This function allows for errors to be capped such that large residuals do not swamp the majority which are near the surface. In some embodiments, σ is 0.005 and α is 0.9.

(2) After a fitting is performed, determine outliers which can be culled. In some embodiments, culling can be performed using a median-based method, which can perform better than a mean-based method due to selection bias when culling.

Eye fitting can be done slightly differently for the reference scan compared to other scans. For the reference scan, the methods disclosed herein can attempt to determine the position 1124a, 1124b of the eye and the correct model of the eye's shape (e.g., radius or radii), which will differ for different subjects. During fitting of a reference scan, the radius of the eyeball model can be allowed to be varied (e.g., freely). For additional scans, the radius can be allowed to vary (e.g., freely) as in the reference scan initially, but the radius can be restricted to match the reference scan value after one or more iterations of culling. Such a process can account for the non-rigidity of the eyeball itself, which may be an issue where the eyelids are tense (e.g., if the subject squints) where the eyelids themselves distort the surface of the eye.

Calculating an Affine Transformation Between Scans

Once the eye positions 1124a, 1124b have been determined, an affine (e.g., rigid body) transformation can be calculated to align the eyes in separate scans. To determine an affine transformation of the head between two scans, three or more points are needed. Since there are only two eyeball centers 1124a, 1124b of eyes of a user in a head scan, a third point can be inferred or created. For example, the third point can be based on the cross product of the axis 1128 formed between the two eye points and the y-axis (e.g., the y-axis 1120y described with reference to FIGS. 11A and 11B). The cross product can be used to determine a vector 1132 along which to place the third point. For example, a point 1136 along this vector 1132 can be selected that is a certain distance (e.g., 1 cm) forward of the center point of the line segment 1128 connecting the eye centers, which can be somewhere in the bridge of the nose of the user. The y-axis 1120y can be approximately perpendicular to the eye axis 1128 if, for example, the subject is properly seated in the scanning stage when performing the initial scan. With this third point, an initial affine alignment can be performed, which removes all but a single DOF pivot along an axis passing through the eye centers.

Adjusting the Final Transformation

The remaining one DOF alignment can be determined by a variety of techniques. For example, the method can apply a skin-based technique using skin features to determine the final DOF of the transformation. In some methods, manual (e.g., operator) input is used for the final DOF. For example, using a trackable point on the subject (such as an artificial tracking point or a facial detail, including a pore or freckle), the final DOF pivot along the axis passing through the eye centers can be determined by a point-to-surface minimization technique applied to the transformation.

In some instances (e.g., in cases like squinting where the eyes narrow), the position of the eye center along the y-axis 1120y can become unstable. An error in alignment resulted from such unstable position of the eye center along the y-axis 1120y as small as, for example, 0.5 mm on a single eye or eye scan can be visible as a rotation about the center point between the eyes (on the z-axis 1120z). Such small errors can be visible to an operator (e.g., a trained animator). The alignment methods disclosed herein can account for or determine such (possible) instability by adjusting the eye position along the y-axis 1120y and recalculating the affine transformation. In some embodiments, the methods can include three controls for final adjustments, such as a y-axis 1120y translational adjustment for the right and left eyeball 1108a, 1108b independently and an x-axis 1120x rotational adjustment (e.g., for situations where the skin target does deform unacceptably). In some cases, errors in a y-axis 1120y measurement may occur and may be compensated for by rotating the rigid transform about the z-axis 1120z. This process can require no or minimal manual intervention with reduction in difficulty (e.g., only a few seconds may be required by an operator to make the final adjustments).

Example Process of Determine a Pose of a Head of a User

Figure 15:
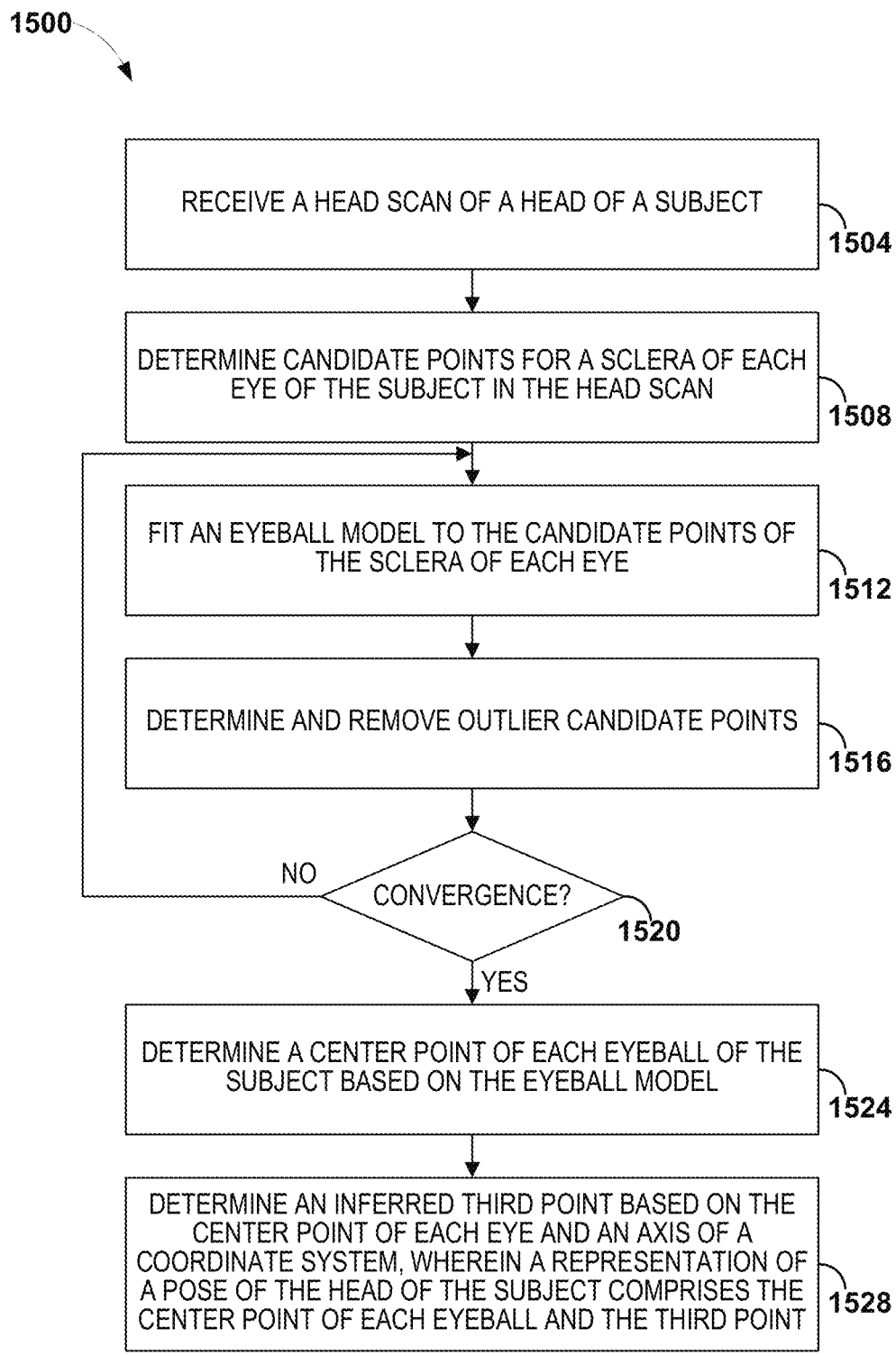
FIG. 15 is a flow diagram of an example process of determining a pose of a head of a subject based on an eyeball model of the subject.

FIG. 15 is a flow diagram of an example process 1500 of determining a pose of a head of a subject based on eyeball models of the subject. A hardware computing system can implement the process 1500. In some cases, a photogrammetric capture stage that obtains the images of the subject is in wired or wireless communication with the hardware computing system that performs the process 1500. In other implementations, the avatar processing and rendering system 690 described with reference to FIG. 6A or the avatar autoscaler 692 described with reference to FIG. 6B can perform the process 1500.

At block 1504, the computing system can receive a head scan of a subject. The head scan of the subject can include an eye scan of each eye of the subject. The head scan can be a reference head scan of the subject or another head scan of the subject, which can be aligned to the reference head scan (or a rig of the subject or a digital representation of the subject) using the method 1600 described below with reference to FIG. 1600. The head scan can comprise a point cloud, a mesh, a red green blue-depth (RGB-D) scan, a plurality of xyz coordinates of the head of the subject, or a combination thereof.

At block 1508, the computing system can determine candidate points for the sclera of each eye of the subject in the head scan. In some embodiments, the candidate points in the eye scan (e.g., the points 1304a, 1304b described with reference to FIG. 13) can be determined using one or more computer vision techniques (e.g., computer vision techniques based on machine learning), manually, or in some other fashion. For example, the candidate points in the eye scan can be determined based on limbic or pupillary boundaries (e.g., the limbic boundaries 1212*a* or the pupillary boundaries 1216*a* described with reference to FIG. 12) of the eye in the eye scan or shapes of the eyelids (e.g., the eyelids 1204*a*, 1204*b* described with reference to FIG. 12). The limbic or pupillary boundaries or shape or position of the eyelids of the eye can be determined using one or more computer vision techniques (e.g., computer vision techniques based on derivatives, such as second derivatives or higher derivatives, of the eye scan, curve fitting, edge detection, wavelet techniques, or other iris or pupil segmentation techniques).

At block 1512, the computing system can fit an eyeball model to the candidate points of the sclera of each eye. For example, fitting the reference eyeball model to the plurality of reference candidate points of the sclera of the each eyeball of the subject can include reducing or minimizing an error statistic based on (1) a radius of the eyeball model of each eyeball of the subject and (2) a distance between a candidate point of the plurality of candidate points of the eyeball of the subject and a center of the eyeball model of the eyeball. As another example, fitting the eyeball model to the plurality of candidate points of the sclera of each eye of the subject can include reducing or minimizing an error statistic based on (1) a radius of the eyeball model of each eyeball of the subject and (2) an average distance between each candidate point of the plurality of candidate points of each eyeball of the subject and a center of the eyeball model of each eyeball. The error statistic can vary between −1.0 and +1.0 over the range −∞ and +∞. The error statistic can be approximately linear near zero and may be bounded to reduce the influence of outliers. For example, the error statistic can be based on a sigmoid function, such as tan h (e.g., Equation [1] above). When fitting the eyeball model to the candidate points of the sclera of each eye, the radius (or radii) of the eyeball model can be fixed or can vary (e.g., during the entire process 1500 or during part of the process 1500).

At block 1516, the computing system can determine and remove one or more outlier candidate points of the candidate points determined at block 1508. The one or more outlier candidate points of the candidate points of the sclera of each eyeball of the subject in the eyeball model can be determined based on a median (or a mean) of the plurality of reference candidate points. Candidate outlier points may be identified as points that differ from the mean of the distribution of points by more than a number of standard deviations of the distribution (e.g., greater than 2, 3, 5, 7, or more standard deviations).

The process 1500 can include iterative fitting of an eyeball model to the candidate points of the sclera of each eye at block 1512 and determining and removing outlier candidate points at block 1516 until a fitting of the eyeball model to the candidate points converges. For example, if a fitting does not converge at decision block 1520, the computing system can proceed to block 1512 to fit an updated eyeball model to the candidate points of the sclera of each eye with the outlier candidate points removed. If the fitting converges at decision block 1520, the method can proceed to block 1524. At block 1520, convergence can be determined, for example, if a difference in an error statistic between iterations decreases below a convergence threshold or if a maximum number of iterations is reached.

At block 1524, the computing system can determine a center point of each eyeball of the subject based on the eyeball model. Parameters of the eyeball model can comprise a geometric shape, such as a sphere, an ellipsoid, or a combination thereof. The parameters of the reference eyeball model can comprise at least one radius. For example, the eyeball model can comprise one radius for a spherical eyeball model. As another example, the eyeball model can comprise two radii (e.g., a major and a minor radius) for an elliptical eyeball model. As yet another example, an eyeball model can comprise three radii (e.g., major and minor axes along three orthogonal directions) for an ellipsoidal eyeball model. Parameters of the eyeball model can include a center point for the geometric shape. The center point of each eyeball can be the center point of each eyeball model. The eyeball model can comprise any type of curved surface to fit the eyeball, for example, a portion of a quadric surface, a surface of revolution, etc., and the eyeball model can comprise any suitable number of parameters to describe its shape or orientation (e.g., a center point, 1, 2, 3, or more radii, ellipticities, etc.).

At block 1528, the computing system can determine an inferred third point of the head of the subject based on the center point of each eyeball determined at block 1528 and an axis of a coordinate system (e.g., the y-axis 1120*y* described with reference to FIG. 14). A representation of a pose of the head of the subject can comprise the center point of each eyeball determined at block 1528 and an inferred third point determined at block 1528. Determining the inferred third point in the head scan can include determining the inferred third point in the head scan based on the center point of the each eyeball of the subject. Determining the inferred third point in the head scan can include determining a reference cross product of (1) an axis formed between the center point (e.g., center points 1124*a*, 1124*b* described with reference to FIG. 14) of the each eyeball of the subject and (2) an axis of a coordinate system of the reference head scan (e.g., the y-axis 1120*y* described with reference to FIG. 14). The inferred third point can be on the cross product (e.g., the cross product 1132 described with reference to FIG. 14). The inferred third point can be away from the head of the subject on the cross product, such as the inferred third point 1136 on the cross product 1132 described with reference to FIG. 14.

Example Process of Aligning Head Scans

Figure 16:
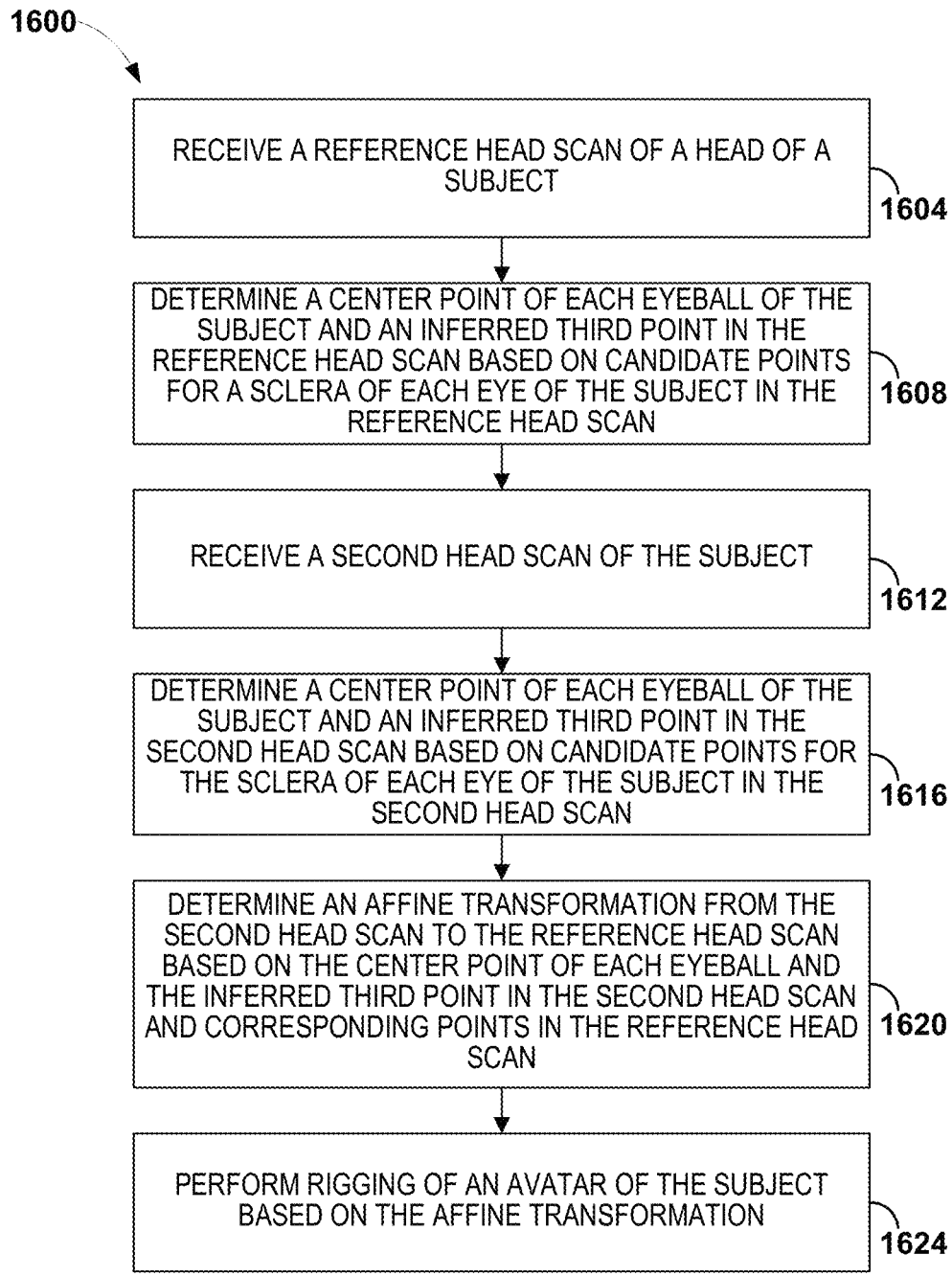
FIG. 16 is a flow diagram of an example process of aligning head scans of a subject.

FIG. 16 is a flow diagram of an example process 1600 of aligning head scans of a subject. A hardware computing system can implement the process 1600. In some cases, a photogrammetric capture stage that obtains the images of the subject is in wired or wireless communication with the hardware computing system that performs the process 1600. In other implementations, the avatar processing and rendering system 690 described with reference to FIG. 6A or the avatar autoscaler 692 described with reference to FIG. 6B can perform the process 1600.

At block 1604, the computing system can receive a reference head scan of a head of a subject. The reference head scan can comprise a point cloud, a mesh, a red green blue-depth (RGB-D) scan, a plurality of xyz coordinates of the head of the subject, or a combination thereof. In some embodiments, a pose of the head of the subject in the reference head scan can be approximately in a direction of the axis of the coordinate system (e.g., the y-axis 1120*y* described with reference to FIG. 14)

At block 1608, the computing system can determine a center point of each eyeball of the subject and an inferred third point in the reference head scan based on candidate points for a sclera of each eye of the subject in the reference head scan. The computing system can determine the center point of each eyeball of the subject and the inferred third point in the reference head using the process 1500 described with reference to FIG. 15. During fitting of a reference scan the radius of the eyeball model can be allowed to be varied (e.g., freely within an anatomically allowable range).

At block 1612, the computing system can receive a second reference head scan of the subject. The second head scan can comprise a point cloud, a mesh, a red green blue-depth (RGB-D) scan, a plurality of xyz coordinates of the head of the subject, or a combination thereof. The reference head scan and the second reference head scan be the same type of head scans (e.g., both head scans can be RGB-D scans) or different types of head scans (e.g., one head scan can comprise a point cloud, and the other head scan can comprise a mesh).

At block 1616, the computing system can the computing system can determine a center point of each eyeball of the subject and an inferred third point in the second head scan based on candidate points for the sclera of each eye of the subject in the second head scan. The computing system can determine the center point of each eyeball of the subject and the inferred third point in the second head using the process 1500 described with reference to FIG. 15. For the second scan (or other additional scans), the radius of the eyeball model can be allowed to vary (e.g., freely) as in the reference scan initially, but the radius can be restricted to match the reference scan value after one or more iterations of fitting and removing outlier candidate points.

At block 1620, the computing system can determine an affine transformation between the second head scan and the reference head scan based on the center point of each eyeball and the inferred third point in the second head scan determined at block 1616 and corresponding points in the reference head scan determined at block 1608. In some embodiments, the computing system can perform the affine transformation on at least the head of the subject in the second head scan to generate an affine-transformed head of the subject in the second head scan. In various embodiments, the affine transformation can be applied to just the head of the subject or can be applied to the entire scan. The computing system can determine a pivot of the affine-transformed second head of the subject in the second head scan relative to the head of the subject in the reference head scan using a trackable point on the head of the subject. For example, the computing system can minimize a distance between the trackable point on the affine-transformed second head of the subject and the trackable point on the head of the subject in the reference head scan). As another example, the computing system can minimize a distance between the trackable point on the affine-transformed second head of the subject and a surface around the trackable point on the head of the subject in the reference head scan. In some embodiments, the computing system can receive a pivot of the affine-transformed second head of the subject in the second head scan relative to the head of the subject in the reference head scan using a trackable point on the head of the subject. In some embodiments, the computing system can receive a translation adjustment of the each eyeball of the subject in the second head scan, a rotational adjustment of eyeballs of the subject in the second head scan, or any combination thereof.

At block 1624, the computing system can generate a rig of an avatar of the subject based on the reference center point of the each eyeball of the subject and the reference inferred point and generate a modified rig of the avatar of the subject based on the affine-transformation. Alternatively, the computing system can generate a digital representation of an avatar of the subject based on the reference center point of the each eyeball of the subject and the reference inferred point and generate a modified digital representation of the avatar of the subject based on the affine-transformation. For example, the computing system can fit an eyeball in a digital puppet based on the affine transformation.

Figure 17:
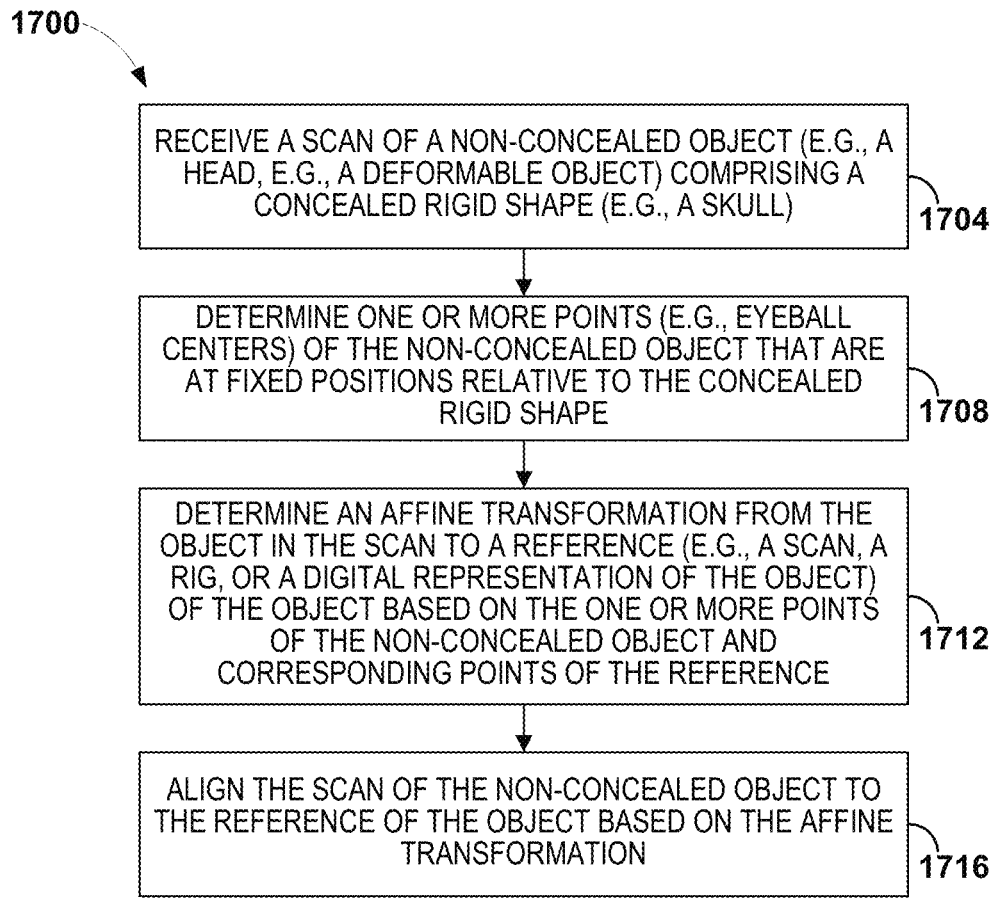
FIG. 17 is a flow diagram of an example process of aligning scans of an object that comprises a concealed portion and an unconcealed portion.

FIG. 17 is a flow diagram of an example process 1700 of aligning scans of an object that comprises a concealed portion and an unconcealed portion. For example the object may comprise the head of a subject being scanned, the concealed portion may comprise the skull, and the unconcealed portion may comprise an eye or eyes of the subject. The object may be at least partly deformable, for example, the subject's skin is disposed over the skull and the skin deforms as the subject performs poses while being scanned (e.g., smiling, frowning, laughing, showing surprise, etc.). The method 1700 can utilize scans of the unconcealed portions (e.g., eye(s)) to determine a position or orientation of a rigid, concealed portion (e.g., the skull), because at least one point of the unconcealed portion is in a fixed relationship to the rigid, concealed portion. Since the rigid, concealed portion is not directly observable (e.g., the scan does not directly show the subject's skull), the method 1700 therefore can use the position or orientation of the unconcealed portion to determine the position or orientation of the rigid, concealed portion and thereby determine a transformation (e.g., an affine transformation) that corrects for movement of the object between scans.

In the example shown in FIG. 17, at block 1704, the method 1700 receives a scan of the non-concealed object, for example, a head scan including scans of the eyes of the subject. At block 1708, the method determines one or points of the non-concealed object that bear a fixed relationship to the concealed rigid object. For example, as described above with reference to FIGS. 15 and 16, the method may utilize measurements of sclera of the eyes to determine two eye centers usable for finding the transformation between object positions in scans. At block 1712, the method determines an affine transformation that compensates for movement of the object between scans. At block 1716, the method can utilize the affine transformation to align, register, or stabilize the position of the object between different scans.

In some embodiments of the method 1700, the affine transformation determined at block 1712 comprises a six DOF transformation. In some such embodiments, the measurement of the unconcealed portions may permit a determination of five of the six DOFs, and the method determines the final DOF via measurements of a deformable portion of the object (e.g., measurements of the skin). Additionally or alternatively, the method 1700 may accept operator input relating to the final DOF.

A hardware computing system can implement the process 1700. In some cases, a photogrammetric capture stage that obtains the images of the subject is in wired or wireless communication with the hardware computing system that performs the process 1700. In other implementations, the avatar processing and rendering system 690 described with reference to FIG. 6A or the avatar autoscaler 692 described with reference to FIG. 6B can perform the process 1700.

Additional Aspects

In some embodiments, head scan alignments determined using the ocular alignment methods can be improved using, additionally or alternatively, pupils or irises as the tracking information (e.g., determining an outer edge of an iris or a pupil and determining a position of the outer edge of the iris or pupil on a sphere or ellipsoid). In some implementations, head scan alignments can be further improved based on the anatomy of the head that maps (e.g., absolutely in some implementations) to the skull's space, such as upper teeth (which typically are not visible in most poses) or from small radio transmitter(s) placed on the subject's teeth. In other embodiments, head scan alignments can be fine-tuned with machine learning methods of tracking markers placed on the face for the purposes of character animation (which can either require training data which is hand stabilized or require adjustment following stabilization). Generation of training data for the machine learning methods can be automated using gradient transfer techniques.

In some embodiments, the ocular alignment methods disclosed herein can be used to automatically place eyeballs inside of a digital puppet of a subject, which allows eyeball spheres of the digital puppet to be moved with no or reduced human intervention. In other embodiments, the ocular alignment methods can be used to align a three-dimensional (3D) scan to a 3D scan, a 3D scan to a rig, and/or a 3D scan to a digital representation.

The technology described herein and in the accompanying figures can be implemented via one or more of the following non-limiting aspects.

1. A system for aligning head scans of a subject, the system comprising: non-transitory memory configured to store: a reference head scan of at least a portion of a head of a subject, and a second head scan of the head of the subject; and a hardware processor in communication with the non-transitory memory, the hardware processor programmed by executable instructions to: receive the reference head scan of the subject; determine a reference center point of each eyeball of the subject and a reference inferred point in the reference head scan based on a plurality of reference candidate points of a sclera of the each eyeball of the subject in the reference head scan; receive the second head scan of the subject; determine a second center point of the each eyeball of the subject and a second inferred point in the second head scan based on a plurality of second candidate points of the sclera of the each eyeball of the subject in the second head scan; determine an affine transformation from the second head scan to the reference head scan based on the second center point of the each eyeball of the subject and the second inferred point in the second head scan and corresponding points in the reference head scan; and perform the affine transformation on at least the head of the subject in the second head scan to generate an affine-transformed head of the subject in the second head scan.

2. The system of aspect 1, wherein the reference head scan comprises a point cloud, a mesh, a red green blue-depth (RGB-D) scan, a plurality of xyz coordinates of the head of the subject, or a combination thereof.

3. The system of any one of aspects 1-2, wherein to determine the reference center point of the each eyeball of the subject, the hardware processor is programmed to: determine a plurality of reference candidate points of the sclera of the each eyeball of the subject in the reference head scan of the subject.

4. The system of aspect 3, wherein to determine the reference center point of the each eyeball of the subject, the hardware processor is further programmed to: fit a reference eyeball model to the plurality of reference candidate points of the sclera of the each eyeball of the subject; and determine the reference center point of the each eyeball based on the reference eyeball model of the each eyeball of the subject.

5. The system of aspect 4, wherein to fit the reference eyeball model to the plurality of reference candidate points of the sclera of the each eyeball of the subject, the hardware processor is programmed to: minimize a first error statistic based on a radius of the reference eyeball model of a first eyeball of the subject and a distance between a reference candidate point of the plurality of reference candidate points of the first eyeball of the subject and a center of the reference eyeball model of the first eyeball.

6. The system of aspect 4, wherein to fit the reference eyeball model to the plurality of reference candidate points of the sclera of the each eyeball of the subject, the hardware processor is programmed to: minimize a first error statistic based on a radius of the reference eyeball model of a first eyeball of the subject and an average distance between each reference candidate point of the plurality of reference candidate points of the first eyeball of the subject and a center of the reference eyeball model of the first eyeball.

7. The system of any one of aspects 5-6, wherein the first error statistic varies between −1.0 and 1.0 over the range −∞ and ∞.

8. The system of any one of aspects 5-7, wherein the first error statistic is approximately linear near zero error.

9. The system of any one of aspects 5-8, wherein the first error statistic is based at least partly on a sigmoidal function.

10. The system of any one of aspects 4-9, wherein to fit the reference eyeball model to the plurality of reference candidate points of the sclera of the each eyeball of the subject, the hardware processor is programmed to: determine one or more reference outlier candidate points of the plurality of reference candidate points of the sclera of the each eyeball of the subject with respect to the reference eyeball model; remove the reference outlier candidate points from the plurality of reference candidate points of the sclera of the each eyeball of the subject; and fit an updated eyeball model to the plurality of reference candidate points of the sclera of the each eyeball of the subject with the reference outlier candidate points removed.

11. The system of aspect 10, wherein to determine the one or more reference outlier candidate points, the hardware processor is programmed to: determine the one or more reference outlier candidate points of the plurality of reference candidate points of the sclera of the each eyeball of the subject in the reference eyeball model based on a median of the plurality of reference candidate points.

12. The system of any one of aspects 4-9, wherein to fit the reference eyeball model to the plurality of reference candidate points of the sclera of the each eyeball of the subject, the hardware processor is programmed to: iteratively fit the reference eyeball model to the plurality of reference candidate points of the sclera of the each eyeball of the subject until a fitting of the reference eyeball model to the plurality of reference candidate points converges.

13. The system of any one of aspects 1-12, wherein to determine the reference inferred point in the reference head scan, the hardware processor is programmed to: determine the reference inferred point in the reference head scan based on the reference center point of the each eyeball of the subject.

14. The system of aspect 13, wherein to determine the reference inferred point in the reference head scan, the hardware processor is further programmed to: determine a reference cross product of an axis formed between the reference center point of the each eyeball of the subject and an axis of a coordinate system of the reference head scan.

15. The system of aspect 14, wherein the reference inferred point is on the reference cross product.

16. The system of aspect 15, wherein the reference inferred point is away from the head of the subject on the reference cross product.

17. The system of any one of aspects 14-16, wherein the axis of the coordinate system is a y-axis of the coordinate system. The y-axis may be along a length of the head of the subject, for example, along a line parallel to or extending from the jaw region upward toward the eye region.

18. The system of any one of aspects 14-17, wherein a pose of the head of the subject in the reference head scan is approximately in a direction of the axis of the coordinate system.

19. The system of any one of aspects 4-18, wherein parameters of the reference eyeball model comprise a geometric shape.

20. The system of aspect 19, wherein the geometric shape comprises a sphere, an ellipsoid, or a combination thereof.

21. The system of any one of aspects 19-20, wherein the parameters of the reference eyeball model comprise at least one radius.

22. The system of aspect 21, wherein to fit the reference eyeball ball model to the reference candidate points of the sclera of the each eyeball of the subject, the hardware processor is programmed to: adjust the at least one radius of the parameters of the reference eyeball model.

23. The system of any one of aspects 1-22, wherein the second head scan comprises a point cloud, a mesh, a red green blue-depth (RGB-D) scan, a plurality of xyz coordinates of the head of the subject, or a combination thereof.

24. The system of any one of aspects 1-23, wherein to determine the second center point of the each eyeball of the subject, the hardware processor is programmed to: determine the plurality of second candidate points of the sclera of the each eyeball of the subject in the reference head scan of the subject.

25. The system of aspect 24, wherein to determine the second center point of the each eyeball of the subject, the hardware processor is further programmed to: fit the reference eyeball model to the plurality of second candidate points of the sclera of the each eyeball of the subject; and determine the second center point of the each eyeball model based on the reference eyeball model of the each eyeball of the subject fitted to plurality of second candidate points.

26. The system of aspect 25, wherein to fit the reference eyeball model to the plurality of second candidate points of the sclera of the each eyeball of the subject, the hardware processor is programmed to: minimize a second error statistic based on a radius of the reference eyeball model of a first eyeball of the subject and a distance between a second candidate point of the plurality of reference candidate points of the first eyeball of the subject and a center of the reference eyeball model of the first eyeball of the subject.

27. The system of aspect 25, wherein to fit the reference eyeball model to the plurality of second candidate points of the sclera of the each eyeball of the subject, the hardware processor is programmed to: minimize a second error statistic based on a radius of the reference eyeball model of a first eyeball of the subject and an average distance between each second candidate point of the plurality of second candidate points of the first eyeball of the subject and a center of the reference eyeball model of the first eyeball of the subject.

28. The system of any one of aspects 26-27, wherein the second error statistic varies between −1.0 and 1.0 over the range −∞ and ∞.

29. The system of any one of aspects 26-28, wherein the second error statistic is approximate linear near zero.

30. The system of any one of aspects 26-28, wherein the second error statistic is based on tan h.

31. The system of any one of aspects 25-30, wherein to fit the reference eyeball model to the plurality of second candidate points of the sclera of the each eyeball of the subject, the hardware processor is programmed to: determine one or more second outlier candidate points of the plurality of second candidate points of the sclera of the each eyeball of the subject in the second eyeball model; remove the second outlier candidate points from the plurality of second candidate points of the sclera of the each eyeball of the subject; and fit an updated reference eyeball model to the plurality of second candidate points of the sclera of the each eyeball of the subject with the second outlier candidate points removed.

32. The system of aspect 31, wherein to determine the one or more second outlier candidate points, the hardware processor is programmed to: determine the one or more reference outlier candidate points of the plurality of reference candidate points of the sclera of the each eyeball of the subject in the reference eyeball model based on a median of the plurality of second candidate points.

33. The system of any one of aspects 25-30, wherein to fit the reference eyeball model to the plurality of second candidate points of the sclera of the each eyeball of the subject, the hardware processor is programmed to: iteratively fit the reference eyeball model to the plurality of second candidate points of the sclera of the each eyeball of the subject until a fitting of the reference eyeball model to the plurality of second candidate points converges.

34. The system of any one of aspects 25-33, wherein to determine the second inferred point in the second head scan, the hardware processor is programmed to: determine the second inferred point in the second head scan based on the second center point of the each eyeball of the subject.

35. The system of aspect 34, wherein to determine the second inferred point in the second head scan, the hardware processor is further programmed to: determine a second cross product of an axis formed between the second center point of the each eyeball of the subject and an axis of a coordinate system of the reference head scan.

36. The system of aspect 35, wherein the second inferred point is on the second cross product.

37. The system of aspect 36, wherein the second inferred point is away from the head of the subject on the second cross product.

38. The system of any one of aspects 35-37, wherein the axis of the coordinate system is a y-axis of the coordinate system.

39. The system of any one of aspects 35-38, wherein the pose of the head of the subject in the reference head scan is approximately in a direction of the axis of the coordinate system.

40. The system of any one of aspects 1-39, wherein the hardware processor is further programmed to: determine a pivot of the affine-transformed second head of the subject in the second head scan relative to the head of the subject in the reference head scan using a trackable point on the head of the subject.

41. The system of aspect 40, wherein to determine the pivot, the hardware processor is programmed to: minimize a distance between the trackable point on the affine-transformed second head of the subject and the trackable point on the head of the subject in the reference head scan.

42. The system of aspect 40, wherein to determine the pivot, the hardware processor is programmed to: minimize a distance between the trackable point on the affine-transformed second head of the subject and a surface around the trackable point on the head of the subject in the reference head scan.

43. The system of any one of aspects 1-42, wherein the hardware processor is further programmed to: receive a pivot of the affine-transformed second head of the subject in the second head scan relative to the head of the subject in the reference head scan using a trackable point on the head of the subject.

44. The system of any one of aspects 1-43, wherein the hardware processor is further programmed to: receive a translation adjustment of the each eyeball of the subject in the second head scan, a rotational adjustment of eyeballs of the subject in the second head scan, or any combination thereof.

45. The system of any one of aspects 1-44, wherein the hardware processor is further programmed to: generate a rig of an avatar of the subject based on the reference center point of the each eyeball of the subject and the reference inferred point; and generate a modified rig of the avatar of the subject based on the affine-transformation.

46. The system of any one of aspects 1-44, wherein the hardware processor is further programmed to: generate a digital representation of an avatar of the subject based on the reference center point of the each eyeball of the subject and the reference inferred point; and generate a modified digital representation of the avatar of the subject based on the affine-transformation.

47. The system of any one of aspects 1-44, wherein the hardware processor is further programmed to: fit an eyeball in a digital puppet based on the affine transformation.

48. A system for determining a pose of a head of a subject, the system comprising: non-transitory memory configured to store: a reference head scan of a head of a subject; and a hardware processor in communication with the non-transitory memory, the hardware processor programmed by executable instructions to: receive the reference head scan of the subject; determine a first reference center point of a first eyeball of the subject based on a plurality of first reference candidate points of a first sclera of the first eyeball of the subject in the reference head scan; determine a second reference center point of a second eyeball of the subject based on a plurality of second reference candidate points of a second sclera of the second eyeball of the subject in the reference head scan; determine a reference inferred point in the reference head scan based on the first reference center point and the second reference center point; and generate a pose of the head of the subject based on the first reference center point, the second reference center point, and the reference inferred point.

49. The system of aspect 48, wherein the reference head scan comprises a point cloud, a mesh, a red green blue-depth (RGB-D) scan, a plurality of xyz coordinates of the head of the subject, or a combination thereof.

50. The system of any one of aspects 48-49, wherein to determine the first reference center point of the first eyeball of the subject, the hardware processor is further programmed to: fit a first reference eyeball model to the plurality of first reference candidate points of the first sclera of the first eyeball of the subject; and determine the first reference center point of the first eyeball based on the first reference eyeball model of the first eyeball of the subject.

51. The system of aspect 50, wherein to fit the first reference eyeball model to the plurality of first reference candidate points of the first sclera of the first eyeball of the subject, the hardware processor is programmed to: minimize a first error statistic based on a radius of the first reference eyeball model of the first eyeball of the subject and a distance between a first reference candidate point of the plurality of first reference candidate points of the first eyeball of the subject and a center of the first reference eyeball model of the first eyeball.

52. The system of aspect 50, wherein to fit the first reference eyeball model to the plurality of first reference candidate points of the first sclera of the first eyeball of the subject, the hardware processor is programmed to: minimize a first error statistic based on a radius of the first reference eyeball model of the first eyeball of the subject and an average distance between each first reference candidate point of the plurality of first reference candidate points of the first eyeball of the subject and a center of the reference eyeball model of the first eyeball.

53. The system of any one of aspects 50-52, wherein the first error statistic varies between −1.0 and 1.0 over the range −∞ and ∞.

54. The system of any one of aspects 50-53, wherein the first error statistic is approximate linear near zero.

55. The system of any one of aspects 50-54, wherein the first error statistic is based on tan h.

56. The system of any one of aspects 50-55, wherein to fit the first reference eyeball model to the plurality of first reference candidate points of the first sclera of the first eyeball of the subject, the hardware processor is programmed to: determine one or more first reference outlier candidate points of the plurality of first reference candidate points of the first sclera of the first eye of the subject with respect to the first reference eyeball model; remove the first reference outlier candidate points from the plurality of first reference candidate points of the first sclera of the first eye of the subject; and fit an updated first eyeball model to the plurality of first reference candidate points of the first sclera of the first eyeball of the subject with the first reference outlier candidate points removed.

57. The system of aspect 56, wherein to determine the one or more first reference outlier candidate points, the hardware processor is programmed to: determine the one or more first reference outlier candidate points of the plurality of first reference candidate points of the first sclera of the first eyeball of the subject in the first reference eyeball model based on a median of the plurality of first reference candidate points.

58. The system of any one of aspects 50-57, wherein to fit the first reference eyeball model to the plurality of first reference candidate points of the first sclera of the first eye of the subject, the hardware processor is programmed to: iteratively fit the first reference eyeball model to the plurality of first reference candidate points of the first sclera of the first eye of the subject until a fitting of the first reference eyeball model to the plurality of first reference candidate points converges.

59. The system of any one of aspects 48-58, wherein to determine the reference inferred point in the reference head scan, the hardware processor is further programmed to: determine a reference cross product of an axis formed between the first reference center point and the second reference center point and an axis of a coordinate system of the reference head scan.

60. The system of aspect 59, wherein the reference inferred point is on the reference cross product.

61. The system of aspect 60, wherein the reference inferred point is away from the head of the subject on the reference cross product.

62. The system of any one of aspects 59-61, wherein the axis of the coordinate system is a y-axis of the coordinate system.

63. The system of any one of aspects 59-62, wherein the pose of the head of the subject in the reference head scan is approximately in a direction of the axis of the coordinate system.

64. The system of any one of aspects 50-63 wherein parameters of the reference eyeball model comprise a geometric shape.

65. The system of aspect 64, wherein the geometric shape comprises a sphere, an ellipsoid, or a combination thereof.

66. The system of any one of aspects 64-65, wherein the first parameters of the first reference eyeball model comprise at least one radius.

67. The system of aspect 66, wherein to fit the reference eyeball ball model to the first reference candidate points of the first sclera of the first eye of the subject, the hardware processor is programmed to: adjust the at least one radius of the first parameters of the first reference eyeball model.

68. The system of any one of aspects 48-67, wherein the hardware processor is further programmed to: receive a second head scan of the subject; determine a first center point of the first eyeball of the subject based on a plurality of first candidate points of the first sclera of the first eyeball of the subject in the second head scan, the first eyeball model, and a second error statistic; determine a second center point of the second eyeball of the subject based on a plurality of second candidate points of the second sclera of the second eyeball of the subject in the second head scan, the second eyeball model, and the second error statistic; determine an inferred point in the head scan based on the first center point and the second center point; and determine an affine transformation from the first center point, the second center point, and the inferred point to the first reference center point, the second reference center point, and the reference inferred point, wherein the affine transformation represents a transformation from the second head scan to the reference head scan.

69. The system of any one of aspects 48-68, wherein the hardware processor is further programmed to: generate a rig of an avatar of the subject based on the reference center point of the each eyeball of the subject and the reference inferred point.

70. The system of any one of aspects 48-68, wherein the hardware processor is further programmed to: generate a digital representation of an avatar of the subject based on the reference center point of the each eyeball of the subject and the reference inferred point.

71. The system of any one of aspects 48-68, wherein the hardware processor is further programmed to: fit an eyeball in a digital puppet based on the affine transformation.

72. A system for determining a pose of a head of a subject, the system comprising: non-transitory memory configured to store: a reference model of a head of a subject comprising a first reference eyeball model of the subject, a second reference eyeball model of the subject, and a reference inferred point of the head of the subject, and a head scan of a head of a subject; and a hardware processor in communication with the non-transitory memory, the hardware processor programmed by executable instructions to: receive the head scan of the subject; determine a first center point of the first eyeball of the subject based on a plurality of first candidate points of a first sclera of the first eyeball of the subject in the head scan; determine a second center point of the second eyeball of the subject based on a plurality of second candidate points of a second sclera of the second eyeball of the subject in the head scan; determine an inferred point in the head scan based on the first center point and the second center point; and determine an affine transformation from the first center point, the second center point, and the inferred point to the first reference center point, the reference second center point, and the reference inferred point, wherein the affine transformation represents a transformation from the head scan to the reference model of the head.

73. The system of aspect 72, wherein the head scan comprises a point cloud, a mesh, a red green blue-depth (RGB-D) scan, a plurality of xyz coordinates of the head of the subject, or a combination thereof.

74. The system of any one of aspects 72-73, wherein to determine the first center point of the first eyeball of the subject, the hardware processor is further programmed to: fit a first eyeball model to the plurality of first candidate points of the first sclera of the first eyeball of the subject; and determine the first center point of the first eyeball based on the first eyeball model of the first eyeball of the subject.

75. The system of aspect 74, wherein to fit the first eyeball model to the plurality of first candidate points of the first sclera of the first eyeball of the subject, the hardware processor is programmed to: minimize a first error statistic based on a radius of the first reference eyeball model of the first eyeball of the subject and a distance between a first candidate point of the plurality of first candidate points of the first eyeball of the subject and a center of the first eyeball model of the first eyeball.

76. The system of aspect 75, wherein to fit the first eyeball model to the plurality of first candidate points of the first sclera of the first eyeball of the subject, the hardware processor is programmed to: minimize a first error statistic based on a radius of the first eyeball model of the first eyeball of the subject and an average distance between each first candidate point of the plurality of first candidate points of the first eyeball of the subject and a center of the eyeball model of the first eyeball.

77. The system of any one of aspects 75-76, wherein the first error statistic varies between −1.0 and 1.0 over the range −∞ and ∞.

78. The system of any one of aspects 75-77, wherein the first error statistic is approximate linear near zero.

79. The system of any one of aspects 75-78, wherein the first error statistic is based on tan h.

80. The system of any one of aspects 74-79, wherein to fit the first eyeball model to the plurality of first candidate points of the first sclera of the first eyeball of the subject, the hardware processor is programmed to: determine one or more first outlier candidate points of the plurality of first candidate points of the first sclera of the first eye of the subject with respect to the first reference eyeball model; remove the first reference outlier candidate points from the plurality of first candidate points of the first sclera of the first eye of the subject; and fit an updated first eyeball model to the plurality of first candidate points of the first sclera of the first eyeball of the subject with the first reference outlier candidate points removed.

81. The system of aspect 80, wherein to determine the one or more first outlier candidate points, the hardware processor is programmed to: determine the one or more first outlier candidate points of the plurality of first candidate points of the first sclera of the first eyeball of the subject in the first reference eyeball model based on a median of the plurality of first candidate points.

82. The system of any one of aspects 74-81, wherein to fit the first reference eyeball model to the plurality of first candidate points of the first sclera of the first eye of the subject, the hardware processor is programmed to: iteratively fit the first reference eyeball model to the plurality of first candidate points of the first sclera of the first eye of the subject until a fitting of the first reference eyeball model to the plurality of first candidate points converges.

83. The system of any one of aspects 74-82, wherein to determine the reference inferred point in the head scan, the hardware processor is further programmed to: determine a cross product of an axis formed between the first center point and the second center point and an axis of a coordinate system of the head scan.

84. The system of aspect 83, wherein the inferred point is on the cross product.

85. The system of aspect 84, wherein the inferred point is away from the head of the subject on the cross product.

86. The system of any one of aspects 83-85, wherein the axis of the coordinate system is a y-axis of the coordinate system.

87. The system of any one of aspects 83-86, wherein the pose of the head of the subject in the head scan is approximately in a direction of the axis of the coordinate system.

88. The system of any one of aspects 72-87 wherein first parameters of the first reference eyeball model comprises a geometric shape.

89. The system of aspect 88, wherein the geometric shape comprises a sphere, an ellipsoid, or a combination thereof.

90. The system of any one of aspects 88-89, wherein the first parameters of the first reference eyeball model comprises at least one radius.

91. The system of any one of aspects 72-90, wherein the hardware processor is further programmed to: receive a reference head scan of the subject; fit the first eyeball model to a plurality of first candidate points of the first sclera of the first eyeball of the subject in the reference head scan, wherein the first eyeball model comprises a first center point of the first eyeball; fit the second eyeball model to a plurality of second candidate points of the second sclera of the second eyeball of the subject in the reference head scan, wherein the second eyeball model comprises a second center point of the second eyeball; and determine a reference inferred point in the reference head scan based on the first reference center point and the second reference center point.

92. The system of aspect 91, wherein the hardware processor is further programmed to: generate a rig of an avatar of the subject based on the first reference center point, the second reference center point, and the reference inferred point.

93. The system of aspect 91, wherein the hardware processor is further programmed to: generate a digital representation of an avatar of the subject based on the first reference center point, the second reference center point, and the reference inferred point.

94. The system of aspect 91, wherein the hardware processor is further programmed to: fit an eyeball in a digital puppet based on the affine transformation.

95. A method for aligning head scans of a subject, the method comprising: under control of a hardware processor: receiving a reference head scan of the subject; determining a reference center point of each eyeball of the subject and a reference inferred point in the reference head scan based on a plurality of reference candidate points of a sclera of the each eyeball of the subject in a reference head scan; receiving the second head scan of the subject; determining a second center point of the each eyeball of the subject and a second inferred point in the second head scan based on a plurality of second candidate points of the sclera of the each eyeball of the subject in the second head scan; determining an affine transformation from the second head scan to the reference head scan based on the second center point of the each eyeball of the subject and the second inferred point in the second head scan and corresponding points in the reference head scan; and performing the affine transformation on the head of the subject in the second head scan to generate an affine-transformed head of the subject in the second head scan.

96. The method of aspect 95, wherein the reference head scan comprises a point cloud, a mesh, a red green blue-depth (RGB-D) scan, a plurality of xyz coordinates of the head of the subject, or a combination thereof.

97. The method of any one of aspects 95-96, wherein determining the reference center point of the each eyeball of the subject comprises: determining a plurality of reference candidate points of the sclera of the each eyeball of the subject in the reference head scan of the subject.

98. The method of aspect 97, wherein determining the reference center point of the each eyeball of the subject comprises: fitting a reference eyeball model to the plurality of reference candidate points of the sclera of the each eyeball of the subject; and determining the reference center point of the each eyeball based on the reference eyeball model of the each eyeball of the subject.

99. The method of aspect 98, wherein fitting the reference eyeball model to the plurality of reference candidate points of the sclera of the each eyeball of the subject comprises: minimizing a first error statistic based on a radius of the reference eyeball model of a first eyeball of the subject and a distance between a reference candidate point of the plurality of reference candidate points of the first eyeball of the subject and a center of the reference eyeball model of the first eyeball.

100. The method of aspect 98, wherein fitting the reference eyeball model to the plurality of reference candidate points of the sclera of the each eyeball of the subject comprises: minimizing a first error statistic based on a radius of the reference eyeball model of a first eyeball of the subject and an average distance between each reference candidate point of the plurality of reference candidate points of the first eyeball of the subject and a center of the reference eyeball model of the first eyeball.

101. The method of any one of aspects 99-100, wherein the first error statistic varies between −1.0 and 1.0 over the range −∞ and ∞.

102. The method of any one of aspects 99-101, wherein the first error statistic is approximately linear near zero error.

103. The method of any one of aspects 99-102, wherein the first error statistic is based at least partly on a sigmoidal function.

104. The method of any one of aspects 98-103, wherein fitting the reference eyeball model to the plurality of reference candidate points of the sclera of the each eyeball of the subject comprises: determining one or more reference outlier candidate points of the plurality of reference candidate points of the sclera of the each eyeball of the subject with respect to the reference eyeball model; removing the reference outlier candidate points from the plurality of reference candidate points of the sclera of the each eyeball of the subject; and fitting an updated eyeball model to the plurality of reference candidate points of the sclera of the each eyeball of the subject with the reference outlier candidate points removed.

105. The method of aspect 104, wherein determining the one or more reference outlier candidate points, the hardware processor is programmed to: determining the one or more reference outlier candidate points of the plurality of reference candidate points of the sclera of the each eyeball of the subject in the reference eyeball model based on a median of the plurality of reference candidate points.

106. The method of any one of aspects 98-103, wherein fitting the reference eyeball model to the plurality of reference candidate points of the sclera of the each eyeball of the subject comprises: iteratively fitting the reference eyeball model to the plurality of reference candidate points of the sclera of the each eyeball of the subject until a fitting of the reference eyeball model to the plurality of reference candidate points converges.

107. The method of any one of aspects 95-106, wherein determining the reference inferred point in the reference head scan comprises: determining the reference inferred point in the reference head scan based on the reference center point of the each eyeball of the subject.

108. The method of aspect 107, wherein determining the reference inferred point in the reference head scan comprises: determining a reference cross product of an axis formed between the reference center point of the each eyeball of the subject and an axis of a coordinate method of the reference head scan.

109. The method of aspect 108, wherein the reference inferred point is on the reference cross product.

110. The method of aspect 109, wherein the reference inferred point is away from the head of the subject on the reference cross product.

111. The method of any one of aspects 108-110, wherein the axis of the coordinate method is a y-axis of the coordinate method.

112. The method of any one of aspects 108-111, wherein a pose of the head of the subject in the reference head scan is approximately in a direction of the axis of the coordinate method.

113. The method of any one of aspects 98-112, wherein parameters of the reference eyeball model comprise a geometric shape.

114. The method of aspect 113, wherein the geometric shape comprises a sphere, an ellipsoid, or a combination thereof.

115. The method of any one of aspects 113-114, wherein the parameters of the reference eyeball model comprise at least one radius.

116. The method of aspect 115, wherein fitting the reference eyeball ball model to the reference candidate points of the sclera of the each eyeball of the subject comprises: adjusting the at least one radius of the parameters of the reference eyeball model.

117. The method of any one of aspects 95-116, wherein the second head scan comprises a point cloud, a mesh, a red green blue-depth (RGB-D) scan, a plurality of xyz coordinates of the head of the subject, or a combination thereof.

118. The method of any one of aspects 95-117, wherein determining the second center point of the each eyeball of the subject comprises: determining the plurality of second candidate points of the sclera of the each eyeball of the subject in the reference head scan of the subject.

119. The method of aspect 118, wherein determining the second center point of the each eyeball of the subject further comprises: fitting the reference eyeball model to the plurality of second candidate points of the sclera of the each eyeball of the subject; and determining the second center point of the each eyeball model based on the reference eyeball model of the each eyeball of the subject fitted to plurality of second candidate points.

120. The method of aspect 119, wherein fitting the reference eyeball model to the plurality of second candidate points of the sclera of the each eyeball of the subject comprises: minimizing a second error statistic based on a radius of the reference eyeball model of a first eyeball of the subject and a distance between a second candidate point of the plurality of reference candidate points of the first eyeball of the subject and a center of the reference eyeball model of the first eyeball of the subject.

121. The method of aspect 119, wherein fitting the reference eyeball model to the plurality of second candidate points of the sclera of the each eyeball of the subject comprises: minimizing a second error statistic based on a radius of the reference eyeball model of a first eyeball of the subject and an average distance between each second candidate point of the plurality of second candidate points of the first eyeball of the subject and a center of the reference eyeball model of the first eyeball of the subject.

122. The method of any one of aspects 120-121, wherein the second error statistic varies between −1.0 and 1.0 over the range −∞ and ∞.

123. The method of any one of aspects 120-122, wherein the second error statistic is approximate linear near zero.

124. The method of any one of aspects 120-122, wherein the second error statistic is based on tan h.

125. The method of any one of aspects 119-124, wherein fitting the reference eyeball model to the plurality of second candidate points of the sclera of the each eyeball of the subject comprises: determining one or more second outlier candidate points of the plurality of second candidate points of the sclera of the each eyeball of the subject in the second eyeball model; removing the second outlier candidate points from the plurality of second candidate points of the sclera of the each eyeball of the subject; and fitting an updated reference eyeball model to the plurality of second candidate points of the sclera of the each eyeball of the subject with the second outlier candidate points removed.

126. The method of aspect 125, wherein determining the one or more second outlier candidate points comprises: determining the one or more reference outlier candidate points of the plurality of reference candidate points of the sclera of the each eyeball of the subject in the reference eyeball model based on a median of the plurality of second candidate points.

127. The method of any one of aspects 119-124, wherein fitting the reference eyeball model to the plurality of second candidate points of the sclera of the each eyeball of the subject comprises: iteratively fitting the reference eyeball model to the plurality of second candidate points of the sclera of the each eyeball of the subject until a fitting of the reference eyeball model to the plurality of second candidate points converges.

128. The method of any one of aspects 119-127, wherein determining the second inferred point in the second head scan comprises: determining the second inferred point in the second head scan based on the second center point of the each eyeball of the subject.

129. The method of aspect 128, wherein determining the second inferred point in the second head scan further comprises: determining a second cross product of an axis formed between the second center point of the each eyeball of the subject and an axis of a coordinate method of the reference head scan.

130. The method of aspect 129, wherein the second inferred point is on the second cross product.

131. The method of aspect 130, wherein the second inferred point is away from the head of the subject on the second cross product.

132. The method of any one of aspects 129-131, wherein the axis of the coordinate method is a y-axis of the coordinate method.

133. The method of any one of aspects 129-132, wherein the pose of the head of the subject in the reference head scan is approximately in a direction of the axis of the coordinate method.

134. The method of any one of aspects 95-133, further comprising: determining a pivot of the affine-transformed second head of the subject in the second head scan relative to the head of the subject in the reference head scan using a trackable point on the head of the subject.

135. The method of aspect 134, wherein determining the pivot comprises: minimizing a distance between the trackable point on the affine-transformed second head of the subject and the trackable point on the head of the subject in the reference head scan.

136. The method of aspect 134, wherein determining the pivot comprises: minimizing a distance between the trackable point on the affine-transformed second head of the subject and a surface around the trackable point on the head of the subject in the reference head scan.

137. The method of any one of aspects 95-136, further comprising: receiving a pivot of the affine-transformed second head of the subject in the second head scan relative to the head of the subject in the reference head scan using a trackable point on the head of the subject.

138. The method of any one of aspects 95-137, further comprising: receiving a translation adjustment of the each eyeball of the subject in the second head scan, a rotational adjustment of eyeballs of the subject in the second head scan, or any combination thereof.

139. The method of any one of aspects 95-138, further comprising: generating a rig of an avatar of the subject based on the reference center point of the each eyeball of the subject and the reference inferred point; and generating a modified rig of the avatar of the subject based on the affine-transformation.

140. The method of any one of aspects 95-138, further comprising: generating a digital representation of an avatar of the subject based on the reference center point of the each eyeball of the subject and the reference inferred point; and generating a modified digital representation of the avatar of the subject based on the affine-transformation.

141. The method of any one of aspects 95-138, further comprising: fitting an eyeball in a digital puppet based on the affine transformation.

142. A method for determining a pose of a head of a subject, the method comprising: under control of a hardware processor: receiving a reference head scan of the subject; determining a first reference center point of a first eyeball of the subject based on a plurality of first reference candidate points of a first sclera of the first eyeball of the subject in the reference head scan; determining a second reference center point of a second eyeball of the subject based on a plurality of second reference candidate points of a second sclera of the second eyeball of the subject in the reference head scan; determining a reference inferred point in the reference head scan based on the first reference center point and the second reference center point; and generating a pose of the head of the subject based on the first reference center point, the second reference center point, and the reference inferred point.

143. The method of aspect 142, wherein the reference head scan comprises a point cloud, a mesh, a red green blue-depth (RGB-D) scan, a plurality of xyz coordinates of the head of the subject, or a combination thereof.

144. The method of any one of aspects 142-143, wherein determining the first reference center point of the first eyeball of the subject further comprises: fitting a first reference eyeball model to the plurality of first reference candidate points of the first sclera of the first eyeball of the subject; and determining the first reference center point of the first eyeball based on the first reference eyeball model of the first eyeball of the subject.

145. The method of aspect 144, wherein fitting the first reference eyeball model to the plurality of first reference candidate points of the first sclera of the first eyeball of the subject comprises: minimizing a first error statistic based on a radius of the first reference eyeball model of the first eyeball of the subject and a distance between a first reference candidate point of the plurality of first reference candidate points of the first eyeball of the subject and a center of the first reference eyeball model of the first eyeball.

146. The method of aspect 144, wherein fitting the first reference eyeball model to the plurality of first reference candidate points of the first sclera of the first eyeball of the subject comprises: minimizing a first error statistic based on a radius of the first reference eyeball model of the first eyeball of the subject and an average distance between each first reference candidate point of the plurality of first reference candidate points of the first eyeball of the subject and a center of the reference eyeball model of the first eyeball.

147. The method of any one of aspects 144-146, wherein the first error statistic varies between −1.0 and 1.0 over the range −∞ and ∞.

148. The method of any one of aspects 144-147, wherein the first error statistic is approximate linear near zero.

149. The method of any one of aspects 144-148, wherein the first error statistic is based on tan h.

150. The method of any one of aspects 144-149, wherein fitting the first reference eyeball model to the plurality of first reference candidate points of the first sclera of the first eyeball of the subject comprises: determining one or more first reference outlier candidate points of the plurality of first reference candidate points of the first sclera of the first eye of the subject with respect to the first reference eyeball model; removing the first reference outlier candidate points from the plurality of first reference candidate points of the first sclera of the first eye of the subject; and fitting an updated first eyeball model to the plurality of first reference candidate points of the first sclera of the first eyeball of the subject with the first reference outlier candidate points removed.

151. The method of aspect 150, wherein determining the one or more first reference outlier candidate points comprises: determining the one or more first reference outlier candidate points of the plurality of first reference candidate points of the first sclera of the first eyeball of the subject in the first reference eyeball model based on a median of the plurality of first reference candidate points.

152. The method of any one of aspects 144-151, wherein fitting the first reference eyeball model to the plurality of first reference candidate points of the first sclera of the first eye of the subject comprises: iteratively fitting the first reference eyeball model to the plurality of first reference candidate points of the first sclera of the first eye of the subject until a fitting of the first reference eyeball model to the plurality of first reference candidate points converges.

153. The method of any one of aspects 142-152, wherein determining the reference inferred point in the reference head scan further comprises: determining a reference cross product of an axis formed between the first reference center point and the second reference center point and an axis of a coordinate method of the reference head scan.

154. The method of aspect 153, wherein the reference inferred point is on the reference cross product.

155. The method of aspect 154, wherein the reference inferred point is away from the head of the subject on the reference cross product.

156. The method of any one of aspects 153-155, wherein the axis of the coordinate method is a y-axis of the coordinate method.

157. The method of any one of aspects 153-156, wherein the pose of the head of the subject in the reference head scan is approximately in a direction of the axis of the coordinate method.

158. The method of any one of aspects 144-157 wherein parameters of the reference eyeball model comprise a geometric shape.

159. The method of aspect 158, wherein the geometric shape comprises a sphere, an ellipsoid, or a combination thereof.

160. The method of any one of aspects 158-159, wherein the first parameters of the first reference eyeball model comprise at least one radius.

161. The method of aspect 160, wherein fitting the reference eyeball ball model to the first reference candidate points of the first sclera of the first eye of the subject comprises: adjusting the at least one radius of the first parameters of the first reference eyeball model.

162. The method of any one of aspects 142-161, further comprising: receiving a second head scan of the subject; determining a first center point of the first eyeball of the subject based on a plurality of first candidate points of the first sclera of the first eyeball of the subject in the second head scan, the first eyeball model, and a second error statistic; determining a second center point of the second eyeball of the subject based on a plurality of second candidate points of the second sclera of the second eyeball of the subject in the second head scan, the second eyeball model, and the second error statistic; determining an inferred point in the head scan based on the first center point and the second center point; and determining an affine transformation from the first center point, the second center point, and the inferred point to the first reference center point, the second reference center point, and the reference inferred point, wherein the affine transformation represents a transformation from the second head scan to the reference head scan.

163. The method of any one of aspects 142-162, further comprising: generating a rig of an avatar of the subject based on the reference center point of the each eyeball of the subject and the reference inferred point.

164. The method of any one of aspects 142-162, further comprising: generating a digital representation of an avatar of the subject based on the reference center point of the each eyeball of the subject and the reference inferred point.

165. The method of any one of aspects 142-162, further comprising: fitting an eyeball in a digital puppet based on the affine transformation.

166. A method for determining a pose of a head of a subject, the method comprising: under control of a hardware processor: a reference model of a head of a subject comprising a reference inferred point of the head of the subject, and a hardware processor in communication with the non-transitory memory, the hardware processor programmed by executable instructions to: receive a head scan of a head of a subject; determine a first center point of the first eyeball of the subject based on a plurality of first candidate points of a first sclera of the first eyeball of the subject in the head scan; determine a second center point of the second eyeball of the subject based on a plurality of second candidate points of a second sclera of the second eyeball of the subject in the head scan; determine an inferred point in the head scan based on the first center point and the second center point; and determine an affine transformation from the first center point, the second center point, and the inferred point to a first reference center point of a reference model of the head, a reference second center point of the reference model, and a reference inferred point of the reference model, wherein the affine transformation represents a transformation from the head scan to the reference model of the head.

167. The method of aspect 166, wherein the head scan comprises a point cloud, a mesh, a red green blue-depth (RGB-D) scan, a plurality of xyz coordinates of the head of the subject, or a combination thereof.

168. The method of any one of aspects 166-167, wherein determining the first center point of the first eyeball of the subject further comprises: fitting a first eyeball model to the plurality of first candidate points of the first sclera of the first eyeball of the subject; and determining the first center point of the first eyeball based on the first eyeball model of the first eyeball of the subject.

169. The method of aspect 168, wherein fitting the first eyeball model to the plurality of first candidate points of the first sclera of the first eyeball of the subject comprises: minimizing a first error statistic based on a radius of the first reference eyeball model of the first eyeball of the subject and a distance between a first candidate point of the plurality of first candidate points of the first eyeball of the subject and a center of the first eyeball model of the first eyeball.

170. The method of aspect 169, wherein fitting the first eyeball model to the plurality of first candidate points of the first sclera of the first eyeball of the subject comprises: minimizing a first error statistic based on a radius of the first eyeball model of the first eyeball of the subject and an average distance between each first candidate point of the plurality of first candidate points of the first eyeball of the subject and a center of the eyeball model of the first eyeball.

171. The method of any one of aspects 169-170, wherein the first error statistic varies between −1.0 and 1.0 over the range −∞ and ∞.

172. The method of any one of aspects 169-171, wherein the first error statistic is approximate linear near zero.

173. The method of any one of aspects 169-172, wherein the first error statistic is based on tan h.

174. The method of any one of aspects 168-173, wherein fitting the first eyeball model to the plurality of first candidate points of the first sclera of the first eyeball of the subject comprises: determining one or more first outlier candidate points of the plurality of first candidate points of the first sclera of the first eye of the subject with respect to the first reference eyeball model; removing the first reference outlier candidate points from the plurality of first candidate points of the first sclera of the first eye of the subject; and fitting an updated first eyeball model to the plurality of first candidate points of the first sclera of the first eyeball of the subject with the first reference outlier candidate points removed.

175. The method of aspect 174, wherein determining the one or more first outlier candidate points comprises: determining the one or more first outlier candidate points of the plurality of first candidate points of the first sclera of the first eyeball of the subject in the first reference eyeball model based on a median of the plurality of first candidate points.

176. The method of any one of aspects 168-175, wherein fitting the first reference eyeball model to the plurality of first candidate points of the first sclera of the first eye of the subject comprises: iteratively fitting the first reference eyeball model to the plurality of first candidate points of the first sclera of the first eye of the subject until a fitting of the first reference eyeball model to the plurality of first candidate points converges.

177. The method of any one of aspects 168-176, wherein determining the reference inferred point in the head scan further comprises: determining a cross product of an axis formed between the first center point and the second center point and an axis of a coordinate method of the head scan.

178. The method of aspect 177, wherein the inferred point is on the cross product.

179. The method of aspect 178 wherein the inferred point is away from the head of the subject on the cross product.

180. The method of any one of aspects 177-179, wherein the axis of the coordinate method is a y-axis of the coordinate method.

181. The method of any one of aspects 177-180, wherein the pose of the head of the subject in the head scan is approximately in a direction of the axis of the coordinate method.

182. The method of any one of aspects 166-181 wherein first parameters of the first reference eyeball model comprises a geometric shape.

183. The method of aspect 182, wherein the geometric shape comprises a sphere, an ellipsoid, or a combination thereof.

184. The method of any one of aspects 182-183, wherein the first parameters of the first reference eyeball model comprises at least one radius.

185. The method of any one of aspects 166-184, further comprising: receiving a reference head scan of the subject; fitting the first eyeball model to a plurality of first candidate points of the first sclera of the first eyeball of the subject in the reference head scan, wherein the first eyeball model comprises a first center point of the first eyeball; fitting the second eyeball model to a plurality of second candidate points of the second sclera of the second eyeball of the subject in the reference head scan, wherein the second eyeball model comprises a second center point of the second eyeball; and determining a reference inferred point in the reference head scan based on the first reference center point and the second reference center point.

186. The method of aspect 185, further comprising: generating a rig of an avatar of the subject based on the first reference center point, the second reference center point, and the reference inferred point.

187. The method of aspect 185, further comprising: generating a digital representation of an avatar of the subject based on the first reference center point, the second reference center point, and the reference inferred point.

188. The method of aspect 185, further comprising: fitting an eyeball in a digital puppet based on the affine transformation.

189. A method for aligning a plurality of scans each comprising at least a portion of a head of a subject, the method comprising: under control of a hardware processor: aligning a first scan and second scan of a plurality of scans of a subject, the first scan and the second scan each comprising at least a portion of a head of the subject, wherein the aligning comprises matching (i) a first reference point based on a visible portion of a first sclera of a first eye of the subject and a second reference point based on a visible portion of a second sclera of a second eye of the subject from the first scan with (ii) a first reference point based on a visible portion of a first sclera of a first eye of and a second reference point based on a visible portion of a second sclera of a second eye from the second scan.

190. The method of aspect 189, wherein the first reference point of the first eye and the second reference point of the second eye from the first scan comprise a first center point of the first eye and a second center point of the second eye.

191. The method of aspect 189 or aspect 190, wherein the first reference point of the first eye and the second reference point of the second eye from the second scan comprise a first center point of the first eye and a second center point of the second eye.

192. The method of any one of aspects 189 to 191, wherein aligning the first scan and the second scan comprises determining an affine transformation from the first scan to the second scan.

193. The method of any one of aspects 189 to 192, further comprising, for either or both of the first scan or the second scan, fitting a first eyeball model to the visible portion of the first sclera of the first eye of the subject or fitting a second eyeball model to the visible portion of the second sclera of the second eye of the subject.

194. The method of aspect 193, wherein fitting the first eyeball model or fitting the second eye ball model comprises determining a first center point of the first eyeball model and a second center point of the second eyeball model.

195. The method of aspect 194, further comprising determining an additional reference point inferred from the first eyeball model or the second eyeball model.

196. The method of aspect 195, wherein the additional reference point is along a line perpendicular to a line between the first center point and the second center point and perpendicular to an axis parallel to a length of the head of the subject.

197. A system for aligning a plurality of scans each comprising at least a portion of a head of a subject, the system comprising: non-transitory memory configured to store a plurality of scans of a subject, each of the plurality of scans comprising at least a portion of a head of the subject; and a hardware processor in communication with the non-transitory memory, the hardware processor programmed to: align a first scan and second scan of the plurality of scans of a subject, wherein to align the first scan and the second scan, the hardware processor is programmed to match: (i) a first reference point based on a visible portion of a first sclera of a first eye of the subject and a second reference point based on a visible portion of a second sclera of a second eye of the subject from the first scan with (ii) a first reference point based on a visible portion of a first sclera of a first eye of and a second reference point based on a visible portion of a second sclera of a second eye from the second scan.

198. The system of aspect 197, wherein the first reference point of the first eye and the second reference point of the second eye from the first scan comprise a first center point of the first eye and a second center point of the second eye.

199. The system of aspect 197 or aspect 198, wherein the first reference point of the first eye and the second reference point of the second eye from the second scan comprise a first center point of the first eye and a second center point of the second eye.

200. The system of any one of aspects 197 to 199, wherein aligning the first scan and the second scan comprises determining an affine transformation from the first scan to the second scan.

201. The system of any one of aspects 197 to 199, further comprising, for either or both of the first scan or the second scan, fitting a first eyeball model to the visible portion of the first sclera of the first eye of the subject or fitting a second eyeball model to the visible portion of the second sclera of the second eye of the subject.

202. The system of aspect 201, wherein fitting the first eyeball model or fitting the second eye ball model comprises determining a first center point of the first eyeball model and a second center point of the second eyeball model.

203. The system of aspect 202, further comprising determining an additional reference point inferred from the first eyeball model or the second eyeball model.

204. The system of aspect 203, wherein the additional reference point is along a line perpendicular to a line between the first center point and the second center point and perpendicular to an axis parallel to a length of the head of the subject.

205. A method for aligning a plurality of scans each comprising a head of a subject, the method comprising: under control of a hardware processor: aligning a sclera of a first eye from a first scan of the plurality of scans with a sclera of the first eye from a second scan of the plurality of scans; and aligning a sclera of a second eye from the first scan of the plurality of scans with a sclera of the second eye from the second scan of the plurality of scans.

206. The method of aspect 205, comprising: determining first candidate points for the sclera of the first eye from the first scan; determining second candidate points for the sclera of the second eye from the first scan; fitting a first eyeball model to the first candidate points; and fitting a second eyeball model to the second candidate points.

207. The method of aspect 206, comprising: determining a first center of the first eyeball model; determining a second center of the second eyeball model; and determining an inferred third point based at least in part on the first center and the second center.

208. The method of aspect 207, comprising: determining a representation of a pose of the head of the subject based at least in part on the first center, the second center, and the inferred third point.

209. A system for aligning a plurality of scans each comprising a head of a subject, the system comprising: non-transitory memory configured to store a plurality of scans comprising a head of a subject; and a hardware processor in communication with the non-transitory memory, the hardware processor programmed to: align a sclera of a first eye from a first scan of the plurality of scans with a sclera of the first eye from a second scan of the plurality of scans; and align a sclera of a second eye from the first scan of the plurality of scans with a sclera of the second eye from the second scan of the plurality of scans.

210. The system of aspect 209, wherein the hardware processor is programmed to: determine first candidate points for the sclera of the first eye from the first scan; determine second candidate points for the sclera of the second eye from the first scan; fit a first eyeball model to the first candidate points; and fit a second eyeball model to the second candidate points.

211. The system of aspect 210, wherein the hardware processor is programmed to: determine a first center of the first eyeball model; determine a second center of the second eyeball model; and determine an inferred third point based at least in part on the first center and the second center.

212. The system of aspect 211, wherein the hardware processor is programmed to: determine a representation of a pose of the head of the subject based at least in part on the first center, the second center, and the inferred third point.

213. A method for aligning a plurality of scans each comprising a head, the method comprising: aligning (i) a first left eye, a first right eye, and a first inferred third point based on the first left eye and the first right eye from a first scan from the plurality of scans with (ii) a second left eye, a second right eye, and a second inferred third point based on the second left eye and the second right eye from a second scan from the plurality of scans.

214. The method of aspect 213, comprising determining the first inferred third point based at least partly on a line between the first left eye and the first right eye and an axis perpendicular to the line.

215. The method of aspect 213 or aspect 214, comprising determining the second inferred third point based at least partly on a line between the second left eye and the second right eye and an axis perpendicular to the line.

216. The method of any one of aspects 213 to 215, wherein the aligning comprises utilizing an affine transformation.

217. The method of aspect 216, further comprising performing rigging of an avatar of the subject based on the affine transformation.

218. A system for aligning a plurality of scans each comprising a head, the system comprising: non-transitory memory configured to store a plurality of scans comprising a head of a subject; and a hardware processor in communication with the non-transitory memory, the hardware processor programmed to: align (i) a first left eye, a first right eye, and a first inferred third point based on the first left eye and the first right eye from a first scan from the plurality of scans with (ii) a second left eye, a second right eye, and a second inferred third point based on the second left eye and the second right eye from a second scan from the plurality of scans.

219. The system of aspect 218, wherein the hardware processor is programmed to determine the first inferred third point based at least partly on a line between the first left eye and the first right eye and an axis perpendicular to the line.

220. The system of aspect 218 or aspect 219, wherein the hardware processor is programmed to determine the second inferred third point based at least partly on a line between the second left eye and the second right eye and an axis perpendicular to the line.

221. The system of any one of aspects 218 to 220, wherein to align, the hardware processor is programmed to utilize an affine transformation.

222. The system of aspect 221, wherein the hardware processor is further programmed to performing rigging of an avatar of the subject based on the affine transformation.

223. The system or method of any of the foregoing aspects, further configured to perform rigging of an avatar of the subject based at least in part on one or more of the aligned scans.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for aligning head scans of a subject, the system comprising:
   non-transitory memory configured to store:
      a reference head scan of at least a portion of a head of the subject, and
      a second head scan of the head of the subject; and
   a hardware processor in communication with the non-transitory memory, the hardware processor programmed by executable instructions to:
      receive the reference head scan of the subject;
         determine a reference center point of each eyeball of the subject and a reference inferred point in the reference head scan based on a plurality of reference candidate points of a sclera of the each eyeball of the subject in the reference head scan;
      receive the second head scan of the subject;
         determine a second center point of the each eyeball of the subject and a second inferred point in the second head scan based on a plurality of second candidate points of the sclera of the each eyeball of the subject in the second head scan;
         determine an affine transformation from the second head scan to the reference head scan based on the second center point of the each eyeball of the subject and the second inferred point in the second head scan and corresponding points in the reference head scan; and
      perform the affine transformation on at least the head of the subject in the head scan.

2. The system of claim 1, wherein the reference head scan comprises a point cloud, a mesh, a red green blue-depth (RGB-D) scan, a plurality of xyz coordinates of the head of the subject, or a combination thereof.

3. The system of claim 1, wherein to determine the reference center point of the each eyeball of the subject, the hardware processor is programmed to:
   determine a plurality of reference candidate points of the sclera of the each eyeball of the subject in the reference head scan of the subject.

4. The system of claim 3, wherein to determine the reference center point of the each eyeball of the subject, the hardware processor is further programmed to:
   fit a reference eyeball model to the plurality of reference candidate points of the sclera of the each eyeball of the subject; and
   determine the reference center point of the each eyeball based on the reference eyeball model of the each eyeball of the subject.

5. The system of claim 4, wherein to fit the reference eyeball model to the plurality of reference candidate points of the sclera of the each eyeball of the subject, the hardware processor is programmed to:
   minimize a first error statistic based on
      a radius of the reference eyeball model of a first eyeball of the subject and
      a distance between a reference candidate point of the plurality of reference candidate points of the first eyeball of the subject and a center of the reference eyeball model of the first eyeball.

6. The system of claim 4, wherein to fit the reference eyeball model to the plurality of reference candidate points of the sclera of the each eyeball of the subject, the hardware processor is programmed to:
   determine one or more reference outlier candidate points of the plurality of reference candidate points of the sclera of the each eyeball of the subject with respect to the reference eyeball model;
   remove the reference outlier candidate points from the plurality of reference candidate points of the sclera of the each eyeball of the subject; and
   fit an updated eyeball model to the plurality of reference candidate points of the sclera of the each eyeball of the subject with the reference outlier candidate points removed.

7. The system of claim 6, wherein to determine the one or more reference outlier candidate points, the hardware processor is programmed to:
   determine the one or more reference outlier candidate points of the plurality of reference candidate points of the sclera of the each eyeball of the subject in the reference eyeball model based on a median of the plurality of reference candidate points.

8. The system of claim 4, wherein to fit the reference eyeball model to the plurality of reference candidate points of the sclera of the each eyeball of the subject, the hardware processor is programmed to:
   iteratively fit the reference eyeball model to the plurality of reference candidate points of the sclera of the each eyeball of the subject until a fitting of the reference eyeball model to the plurality of reference candidate points converges.

9. The system of claim 4, wherein to fit the reference eyeball model to the reference candidate points of the sclera of the each eyeball of the subject, the hardware processor is programmed to:
   adjust at least one radius of the parameters of the reference eyeball model.

10. The system of claim 1, wherein to determine the reference inferred point in the reference head scan, the hardware processor is programmed to:
    determine the reference inferred point in the reference head scan based on the reference center point of the each eyeball of the subject.

11. The system of claim 10, wherein to determine the reference inferred point in the reference head scan, the hardware processor is further programmed to:
    determine a reference cross product of
       an axis formed between the reference center point of the each eyeball of the subject and
       an axis of a coordinate system of the reference head scan.

12. The system of claim 1, wherein the affine transformation generates an affine-transformed head of the subject in the second head scan and the hardware processor is further programmed to:
determine a pivot of the affine-transformed second head of the subject in the second head scan relative to the head of the subject in the reference head scan using a trackable point on the head of the subject.

13. The system of claim 12, wherein to determine the pivot, the hardware processor is programmed to:
minimize a distance between the trackable point on the affine-transformed second head of the subject and the trackable point on the head of the subject in the reference head scan.

14. The system of claim 12, wherein to determine the pivot, the hardware processor is programmed to:
minimize a distance between the trackable point on the affine-transformed second head of the subject and a surface around the trackable point on the head of the subject in the reference head scan.

15. The system of claim 1, wherein the hardware processor is further programmed to:
receive a pivot of the affine-transformed second head of the subject in the second head scan relative to the head of the subject in the reference head scan using a trackable point on the head of the subject.

16. The system of claim 1, wherein the hardware processor is further programmed to:
receive a translation adjustment of the each eyeball of the subject in the second head scan, a rotational adjustment of eyeballs of the subject in the second head scan, or any combination thereof.

17. The system of claim 1, wherein the hardware processor is further programmed to:
generate a rig of an avatar of the subject based on the reference center point of the each eyeball of the subject and the reference inferred point; and
generate a modified rig of the avatar of the subject based on the affine-transformation.

18. The system of claim 1, wherein the hardware processor is further programmed to:
generate a digital representation of an avatar of the subject based on the reference center point of the each eyeball of the subject and the reference inferred point; and
generate a modified digital representation of the avatar of the subject based on the affine-transformation.

19. The system of claim 1, wherein the hardware processor is further programmed to:
fit an eyeball in a digital puppet based on the affine transformation.

20. A system for determining a pose of a head of a subject, the system comprising:
non-transitory memory configured to store:
a reference head scan of the head of the subject; and
a hardware processor in communication with the non-transitory memory, the hardware processor programmed by executable instructions to:
receive the reference head scan of the subject;
determine a first reference center point of a first eyeball of the subject based on a plurality of first reference candidate points of a first sclera of the first eyeball of the subject in the reference head scan;
determine a second reference center point of a second eyeball of the subject based on a plurality of second reference candidate points of a second sclera of the second eyeball of the subject in the reference head scan;
determine a reference inferred point in the reference head scan based on the first reference center point and the second reference center point; and
a determine the pose of the head of the subject based on the first reference center point, the second reference center point, and the reference inferred point.

21. A system for determining a pose of a head of a subject, the system comprising:
non-transitory memory configured to store:
a reference model of the head of the subject comprising
a first reference eyeball model of the subject,
a second reference eyeball model of the subject, and
a reference inferred point of the head of the subject, and
a head scan of the head of the subject; and
a hardware processor in communication with the non-transitory memory, the hardware processor programmed by executable instructions to:
receive the head scan of the subject;
determine a first center point of a first eyeball of the subject based on a plurality of first candidate points of a first sclera of the first eyeball of the subject in the head scan;
determine a second center point of a second eyeball of the subject based on a plurality of second candidate points of a second sclera of the second eyeball of the subject in the head scan;
determine an inferred point in the head scan based on the first center point and the second center point; and
determine an affine transformation from the first center point, the second center point, and the inferred point to the first reference center point, the reference second center point, and the reference inferred point, wherein the affine transformation represents a transformation from the head scan to the reference model of the head.

22. A method for aligning head scans of a subject, the method comprising:
under control of a hardware processor:
receiving a reference head scan of the subject;
determining a reference center point of each eyeball of the subject and a reference inferred point in the reference head scan based on a plurality of reference candidate points of a sclera of the each eyeball of the subject in the reference head scan;
receiving a second head scan of the subject;
determining a second center point of the each eyeball of the subject and a second inferred point in the second head scan based on a plurality of second candidate points of the sclera of the each eyeball of the subject in the second head scan;
determining an affine transformation from the second head scan to the reference head scan based on the second center point of the each eyeball of the subject and the second inferred point in the second head scan and corresponding points in the reference head scan; and
performing the affine transformation on the head of the subject in the second head scan to generate an affine-transformed head of the subject in the second head scan.

23. A method for determining a pose of a head of a subject, the method comprising:
under control of a hardware processor:
receiving a reference head scan of the subject;
determining a first reference center point of a first eyeball of the subject based on a plurality of first reference candidate points of a first sclera of the first eyeball of the subject in the reference head scan;

determining a second reference center point of a second eyeball of the subject based on a plurality of second reference candidate points of a second sclera of the second eyeball of the subject in the reference head scan;

determining a reference inferred point in the reference head scan based on the first reference center point and the second reference center point; and determining the pose of the head of the subject based on the first reference center point, the second reference center point, and the reference inferred point.

24. A method for determining a pose of a head of a subject, the method comprising:

under control of a hardware processor:

access a reference model of the head of the subject comprising a reference inferred point of the head of the subject;

access a head scan of the head of the subject;

determine a first center point of a first eyeball of the subject based on a plurality of first candidate points of a first sclera of the first eyeball of the subject in the head scan;

determine a second center point of a second eyeball of the subject based on a plurality of second candidate points of a second sclera of the second eyeball of the subject in the head scan;

determine an inferred point in the head scan based on the first center point and the second center point; and determine an affine transformation from the first center point, the second center point, and the inferred point to a first reference center point of the reference model of the head, a reference second center point of the reference model, and the reference inferred point of the reference model, wherein the affine transformation represents a transformation from the head scan to the reference model of the head.

25. A computerized method comprising:

under control of a hardware processor:

aligning a first scan and a second scan of a plurality of scans of a subject, the first scan and the second scan each comprising at least a portion of a head of the subject, wherein the aligning comprises matching a first reference point based on a visible portion of a first sclera of a first eye of the subject and a second reference point based on a visible portion of a second sclera of a second eye of the subject from the first scan with a first reference point based on a visible portion of a first sclera of a first eye of and a second reference point based on a visible portion of a second sclera of a second eye from the second scan.

26. A system comprising:

non-transitory memory configured to store a plurality of scans of a subject, each of the plurality of scans comprising at least a portion of a head of the subject; and a hardware processor in communication with the non-transitory memory, the hardware processor programmed to:

align a first scan and second scan of the plurality of scans of a subject, wherein to align the first scan and the second scan, the hardware processor is programmed to match:

a first reference point based on a first visible portion of a first sclera of a first eye of the subject and a second reference point based on a second visible portion of a second sclera of a second eye of the subject from the first scan with a first reference point based on a first visible portion of a first sclera of a first eye of the subject and a second reference point based on a second visible portion of a second sclera of a second eye from the second scan.

27. A method for aligning a plurality of scans each comprising a head of a subject, the method comprising:

under control of a hardware processor:

aligning a sclera of a first eye from a first scan of the plurality of scans with a sclera of the first eye from a second scan of the plurality of scans; and aligning a sclera of a second eye from the first scan of the plurality of scans with a sclera of the second eye from the second scan of the plurality of scans.

28. A system comprising:

non-transitory memory configured to store a plurality of scans comprising a head of a subject; and a hardware processor in communication with the non-transitory memory, the hardware processor programmed to:

align a sclera of a first eye from a first scan of the plurality of scans with a sclera of the first eye from a second scan of the plurality of scans; and align a sclera of a second eye from the first scan of the plurality of scans with a sclera of the second eye from the second scan of the plurality of scans.

29. A method for aligning a plurality of scans each comprising a head, the method comprising:

aligning (i) a first left eye, a first right eye, and a first inferred third point based on the first left eye and the first right eye from a first scan from the plurality of scans with (ii) a second left eye, a second right eye, and a second inferred third point based on the second left eye and the second right eye from a second scan from the plurality of scans.

30. A system comprising:

non-transitory memory configured to store a plurality of scans comprising a head of a subject; and a hardware processor in communication with the non-transitory memory, the hardware processor programmed to:

align (i) a first left eye, a first right eye, and a first inferred third point based on the first left eye and the first right eye from a first scan from the plurality of scans with (ii) a second left eye, a second right eye, and a second inferred third point based on the second left eye and the second right eye from a second scan from the plurality of scans.

31. A system for aligning head scans of a subject, the system comprising:

non-transitory memory configured to store:

a head scan of at least a portion of a head of the subject; and a reference head scan of at least a portion of the head of the subject, and a hardware processor in communication with the non-transitory memory, the hardware processor programmed by executable instructions to:

based at least on the head scan,
- determine a first center point of a first eyeball in the head scan based on a first plurality of candidate points associated with a first sclera of the first eyeball;
- determine a second center point of a second eyeball based in the head scan based on a second plurality of candidate points associated with a second sclera of the second eyeball; and
- determine an inferred point based at least on the first and second center points;

based at least on the reference head scan,
- determine a first reference center point of a first reference eyeball in the reference head scan based on a first plurality of reference candidate points associated with a first reference sclera of the first reference eyeball;
- determine a second reference center point of a second reference eyeball in the reference head scan based on a second plurality of reference candidate points associated with a second reference sclera of the second eyeball;
- determine a reference inferred point based at least on the first and second reference center points;
- determine an affine transformation from the head scan to the reference head scan based at least on the determined center points and inferred points of the head scan and the reference head scan, wherein the affine transformation is usable to generate an affine-transformed head of the subject.

* * * * *

UNITED STATES PATENT AND TRADEMARK OFFICE
CERTIFICATE OF CORRECTION

PATENT NO. : 11,275,433 B2
APPLICATION NO. : 16/280740
DATED : March 15, 2022
INVENTOR(S) : Wedig It is certified that error appears in the above-identified patent and that said Letters Patent is hereby corrected as shown below:

On the Title Page

Page 2, Column 2 (Other Publications), Line 5, delete "3, ," and insert -- 3, --.

Page 2, Column 2 (Other Publications), Line 16, delete "E plicit" and insert -- Explicit --.

In the Specification

Column 12, Line 57, delete "4400b." and insert -- 440b. --.

Column 37, Line 24, delete "∞∞∞" and insert -- -∞ --.

Column 40, Line 59, delete "14)" and insert -- 14). --.

In the Claims

Column 68, Line 4, Claim 20, delete "a determine" and insert -- determine --.

Signed and Sealed this
Twenty-first Day of June, 2022

Katherine Kelly Vidal
*Director of the United States Patent and Trademark Office*